May 13, 1952 H. J. MICHAEL ET AL 2,596,584
PULSE CONVERSION SYSTEM
Filed Dec. 16, 1949 21 Sheets-Sheet 1

INVENTORS H. J. MICHAEL
W. WHITNEY
BY C. Mathis
ATTORNEY

May 13, 1952 H. J. MICHAEL ET AL 2,596,584

PULSE CONVERSION SYSTEM

Filed Dec. 16, 1949 21 Sheets-Sheet 2

INVENTORS H. J. MICHAEL
W. WHITNEY
BY C. Mathiee
ATTORNEY

INVENTORS H. J. MICHAEL
W. WHITNEY
BY C. Mathie
ATTORNEY

May 13, 1952 H. J. MICHAEL ET AL 2,596,584

PULSE CONVERSION SYSTEM

Filed Dec. 16, 1949 21 Sheets-Sheet 4

INVENTORS H. J. MICHAEL
W. WHITNEY
BY C. Mattice

ATTORNEY

May 13, 1952 H. J. MICHAEL ET AL 2,596,584

PULSE CONVERSION SYSTEM

Filed Dec. 16, 1949 21 Sheets-Sheet 5

INVENTORS H. J. MICHAEL
W. WHITNEY
BY C. Mathias

ATTORNEY

INVENTORS H. J. MICHAEL
W. WHITNEY
BY C. Mathie
ATTORNEY

INVENTORS H. J. MICHAEL
W. WHITNEY
BY C. Mattice
ATTORNEY

INVENTORS H. J. MICHAEL
W. WHITNEY
BY C. Mathis
ATTORNEY

INVENTORS H. J. MICHAEL
W. WHITNEY
BY C. Mathie
ATTORNEY

INVENTORS H. J. MICHAEL
W. WHITNEY
BY C. Mathies
ATTORNEY

PULSE CONVERSION SYSTEM

Filed Dec. 16, 1949

INVENTORS H. J. MICHAEL
W. WHITNEY
BY C. Mattice
ATTORNEY

INVENTORS H. J. MICHAEL
W. WHITNEY
BY C. Mattice
ATTORNEY

INVENTORS H. J. MICHAEL
W. WHITNEY
BY C. Mathieu
ATTORNEY

INVENTORS H. J. MICHAEL
W. WHITNEY
BY C. Mathis
ATTORNEY

INVENTORS H. J. MICHAEL
W. WHITNEY
BY C. Mathise
ATTORNEY

INVENTORS H. J. MICHAEL
W. WHITNEY
BY C. Mattice
ATTORNEY

May 13, 1952 H. J. MICHAEL ET AL 2,596,584

PULSE CONVERSION SYSTEM

Filed Dec. 16, 1949 21 Sheets-Sheet 17

INVENTORS H. J. MICHAEL
W. WHITNEY
BY C. Mattice
ATTORNEY

May 13, 1952 H. J. MICHAEL ET AL 2,596,584

PULSE CONVERSION SYSTEM

Filed Dec. 16, 1949 21 Sheets-Sheet 18

INVENTORS H. J. MICHAEL
W. WHITNEY
BY C. Mathie

ATTORNEY

May 13, 1952 H. J. MICHAEL ET AL 2,596,584

PULSE CONVERSION SYSTEM

Filed Dec. 16, 1949 21 Sheets-Sheet 19

INVENTORS H. J. MICHAEL
W. WHITNEY
BY C. Mathie
ATTORNEY

May 13, 1952 H. J. MICHAEL ET AL 2,596,584

PULSE CONVERSION SYSTEM

Filed Dec. 16, 1949 21 Sheets-Sheet 20

INVENTORS H. J. MICHAEL
W. WHITNEY
BY C. Mattice
ATTORNEY

INVENTORS H. J. MICHAEL
W. WHITNEY
BY C. Mattice
ATTORNEY

Patented May 13, 1952

2,596,584

UNITED STATES PATENT OFFICE 2,596,584

PULSE CONVERSION SYSTEM

Henry J. Michael, Mineola, N. Y., and Wiley Whitney, Madison, N. J., assignors to Bell Telephone Laboratories, Incorporated, New York, N. Y., a corporation of New York Application December 16, 1949, Serial No. 133,382

6 Claims. (Cl. 179—27)

This invention relates to automatic telephone systems and has for its object to facilitate the establishment of connections between offices employing different types of automatic equipment.

Heretofore it has been the general custom to set up such interoffice calls under the control of register senders which are equipped with registers to be set in accordance with the type of pulses employed in the office in which the call originates and with sending mechanism to send out pulses of the type required by the office in which the call terminates.

Recently a cross bar system has been developed in which the registering function has been separated from the sending function and separate apparatus units known as registers and senders are provided for the two functions. In addition, different types of registers are provided to receive different types of pulses and different types of senders are provided to send out different types of pulses. Such a system is disclosed in Patent No. 2,585,904, granted to A. J. Busch, February 19, 1952.

Trunks incoming to such a cross bar office are arranged to be connected with an incoming register equipped to receive the type of pulses employed at the office from which the trunk comes, while trunks outgoing from the cross bar office are arranged to be connected with a sender equipped to send out the type of pulses required by the office to which the trunk extends.

Operators' positions have direct trunks leading to various offices which may require a variety of controlling pulses. Each position is normally equipped with a key-set for generating pulses of the most useful type, while trunks leading to offices of other types have formerly been given access to the previous type of register sender.

In accordance with the present invention, trunks outgoing from the operator's position are arranged to be connected with one of the local incoming registers, and means is provided, responsive to the registration of a designation to also connect one of the local outgoing senders to the same trunk for transmitting the designation to the distant office.

A feature of the invention lies in setting up an indication in the incoming register of the type of outpulsing required to control the selection of the proper type of outgoing sender.

This indication is transferred to a switch controlling marker, to cause it to select the proper type of sender, connect the sender with the trunk, transfer the designation to the sender, and release without performing any switch controlling functions.

These and other features of the invention will be more clearly understood from a consideration of the following description in connection with the drawing, in which.

In the subsequent description, functional designations are used, followed by the number of the figure in which the element occurs set off by parentheses.

Figure 5:
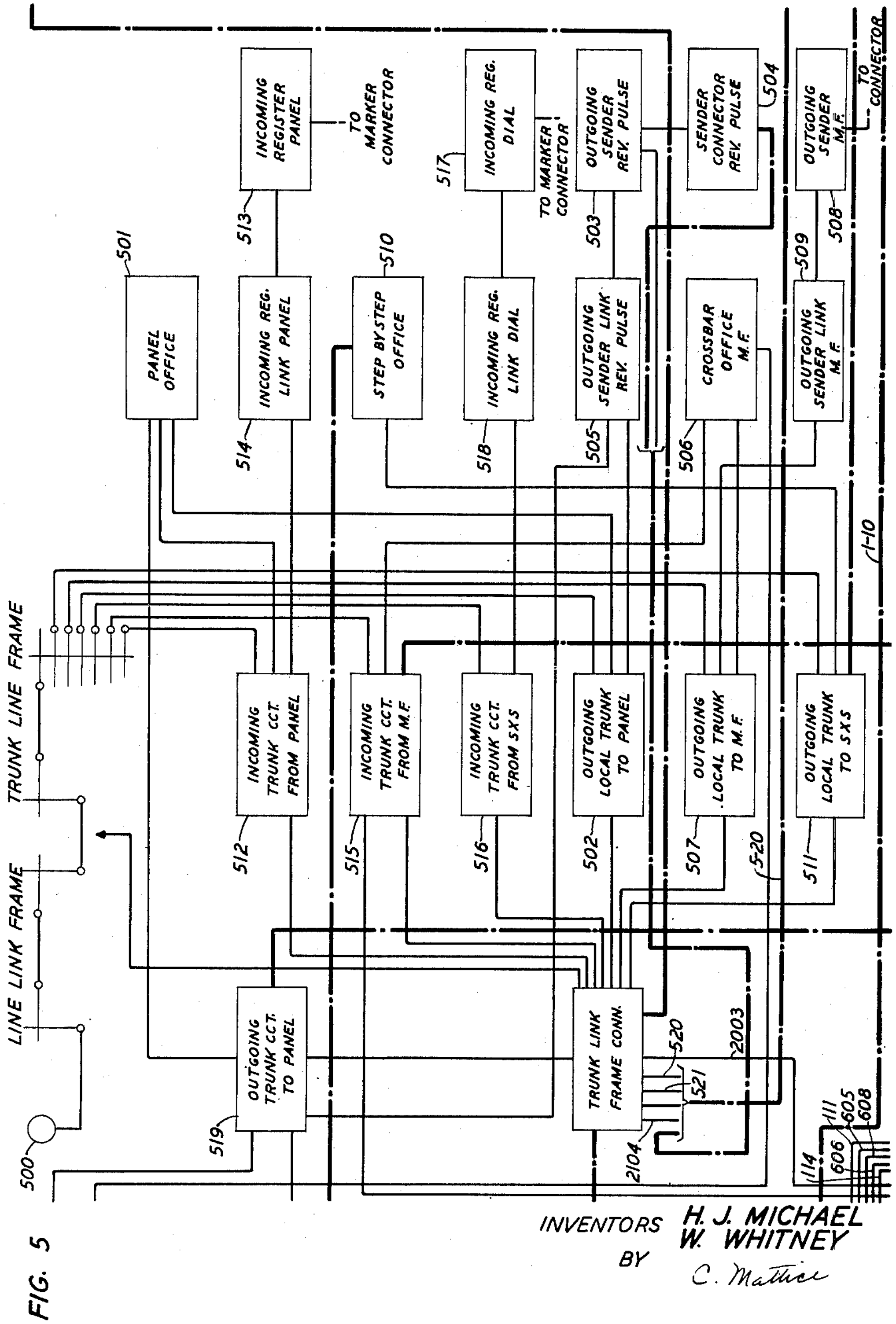
Fig. 5 shows in schematic form the circuits used by a local office for completing a variety of calls together with an additional trunk from the operator's position to a panel office.

Referring first to Fig. 5, a brief description of the operation of the local office equipment will be given. As described in detail in the above-identified Busch patent, the local office employs two types of switch frames, namely, line link frames and trunk link frames, there being primary and secondary switches on each frame. By means of these frames any subscriber's line, such as line 500, may be connected with an originating register, an outgoing trunk, or an incoming trunk, and by means of an intraoffice trunk and two connections through the frames with any other subscriber. All types of trunks appear in the secondary switches of the trunk frame and are distributed over the frames so that, in general, all types of trunks appear on every frame. While in practice the arrangement shown in Fig. 5 would probably not be used, for convenience the local trunk shown are represented as appearing in the same secondary trunk switch.

All calls are set up under the control of a marker, to which the designation of the desired line is transmitted for local or outgoing calls from an originating register (not shown) and for incoming calls from incoming registers, the marker obtaining access to the trunk link frame by means of a trunk link frame connector.

For transmitting designations to other offices, the outgoing trunks are associated with outgoing senders, there being a separate group of senders arranged to generate each type of pulsing required by a distant office. Similarly, the incoming trunks are associated with incoming registers, there being a separate group of registers equipped to receive each type of pulsing sent out by a distant office.

More specifically, if the subscriber on line 500 wishes to call a subscriber in a panel-type office 501 which receives designations by means of revertive type pulses, the marker selects an outgoing trunk such as trunk 502, selects an idle outgoing sender equipped to respond to revertive pulses such as sender 503, connects with that sender by means of a sender connector individual to that type of sender such as connector 504, transfers the designation to the sender and controls the connection of the sender to the trunk by means of an outgoing sender link, such as link 505. The marker and connector then release and the sender transmits all or a part of the designation over the trunk to the panel office. The revertive type sender, link and connector may also be used with trunks (not shown) leading to certain types of cross bar offices which also receive designations by means of revertive pulses.

For a local call to a cross bar office such as office 506 which receives designations by means of multifrequency pulses, the marker selects an outgoing trunk such as trunk 507, a sender arranged to transmit multifrequency pulses such as sender 508, connects with the sender by means of a sender connector individual to the multifrequency senders and controls the connection of the sender with the trunk over a sender link 509 individual to that type of senders.

Figure 10:
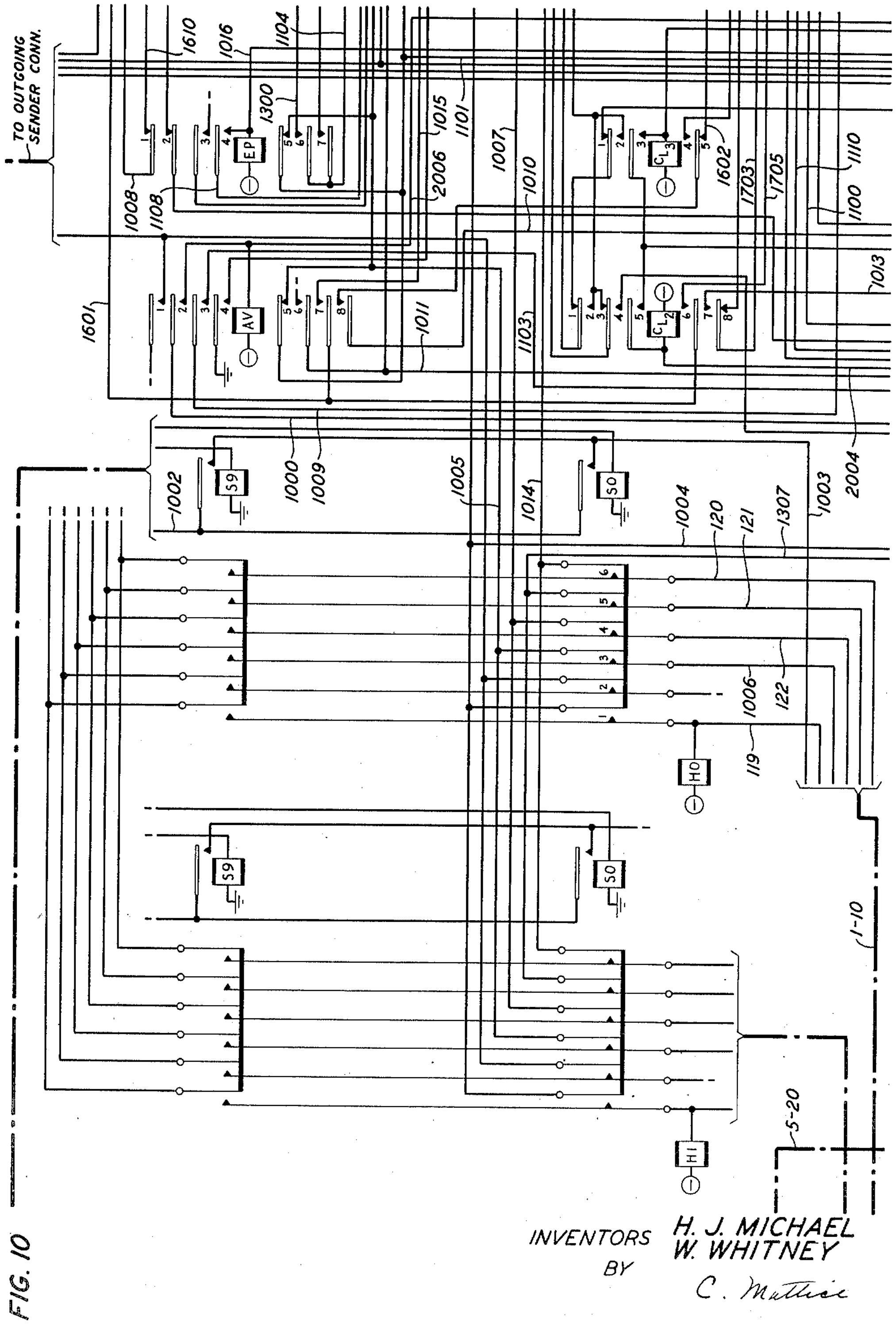
Fig. 10 shows an outgoing sender link for connecting a trunk with an outgoing sender.
Figure 11:
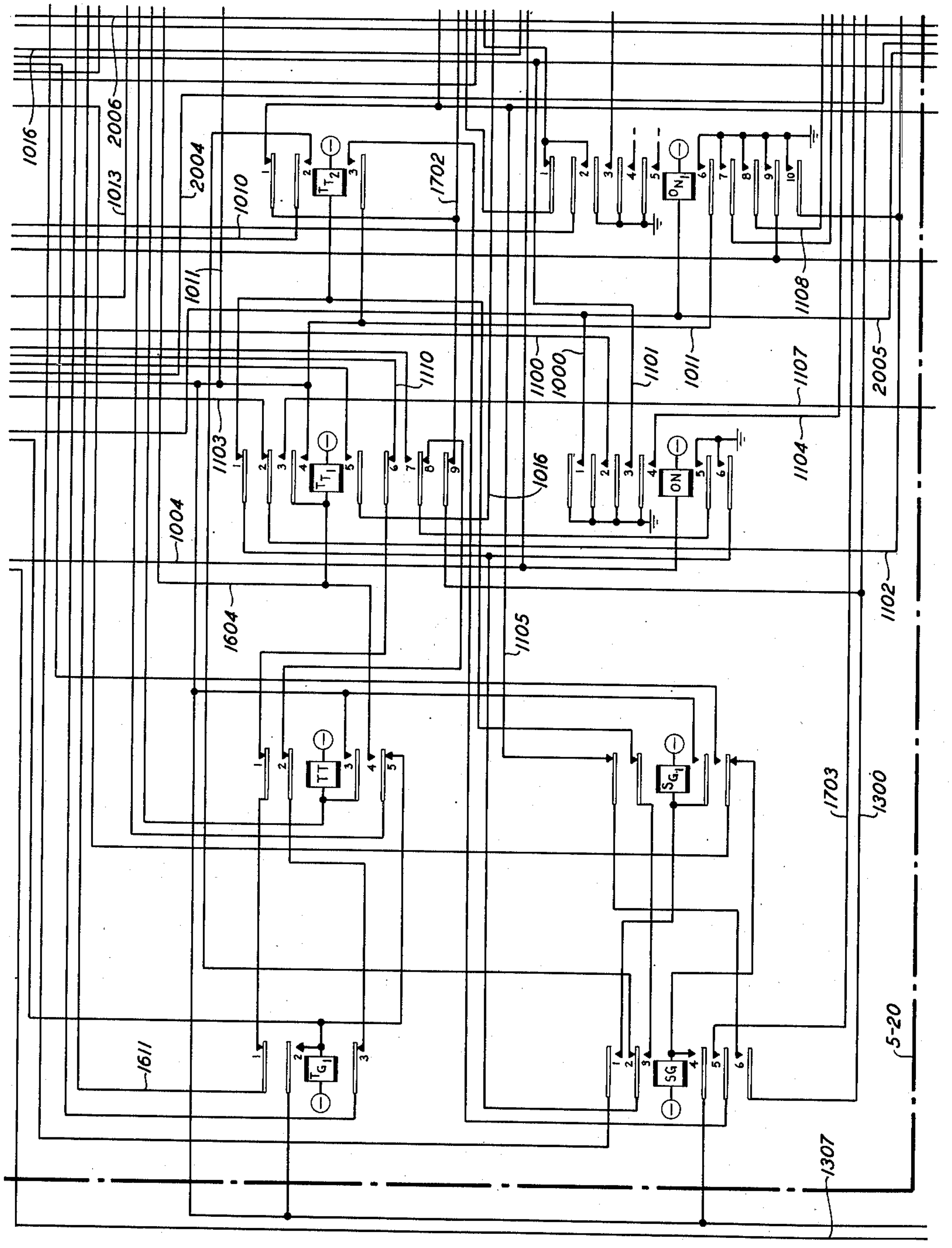
Figs. 11, 13, 16, 17, 18 and 19 show an outgoing sender.
Figure 12:
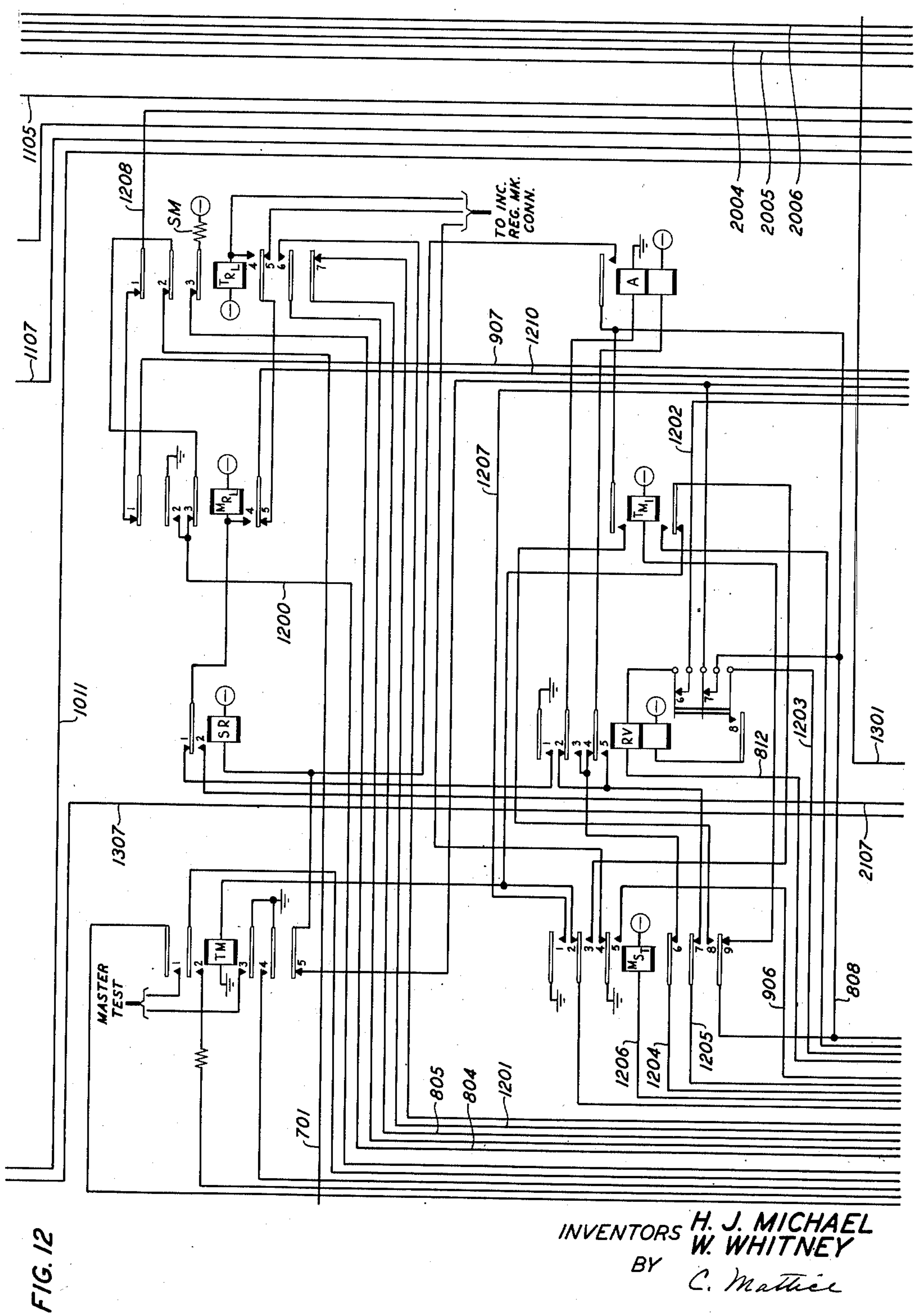
Figure 13:
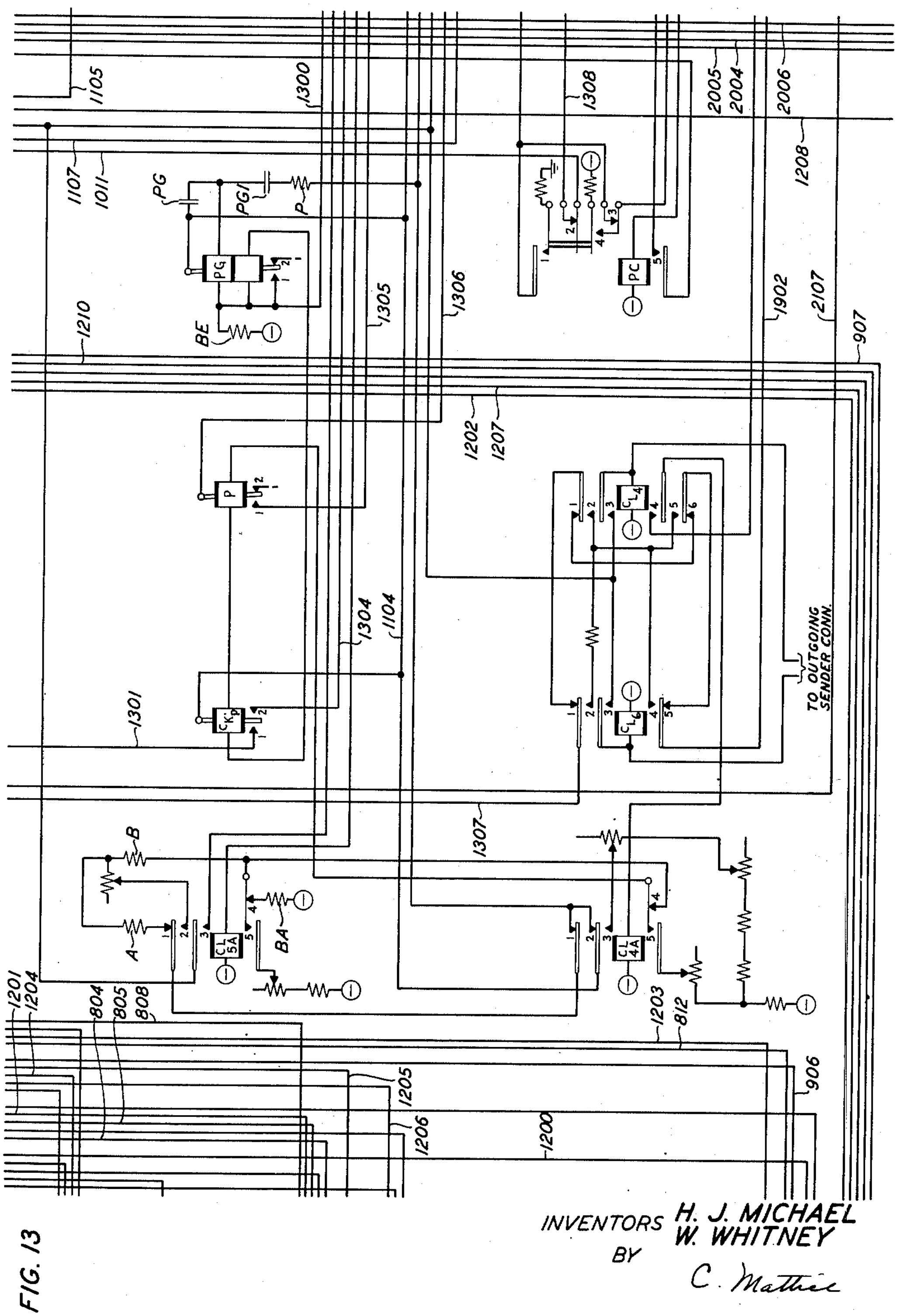
Figure 14:
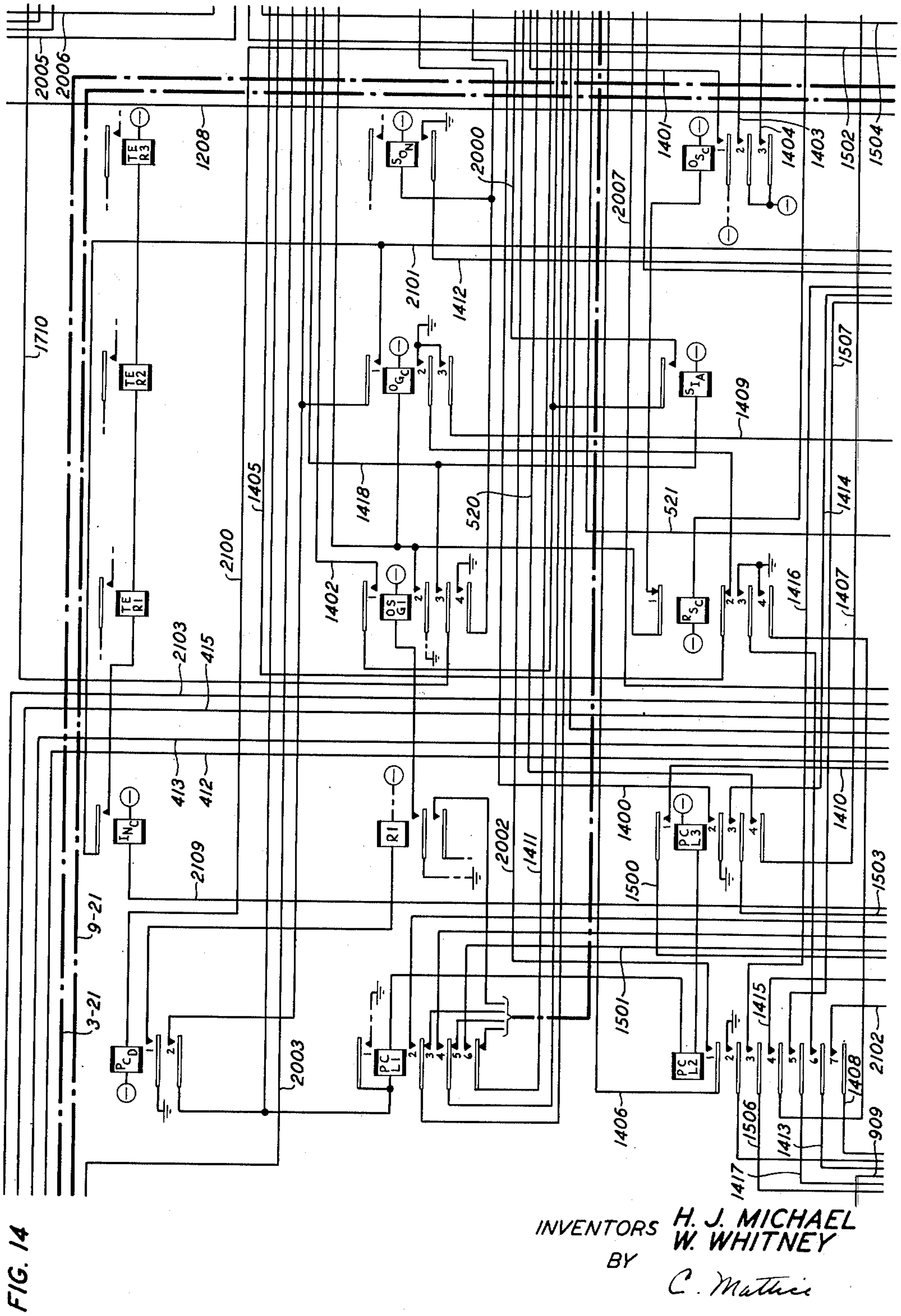
Figs. 14, 15 and 20 show parts of a marker associated with the incoming registers and outgoing senders, Fig. 20 including parts of a sender connector for connecting the marker with an outgoing sender.
Figure 20:
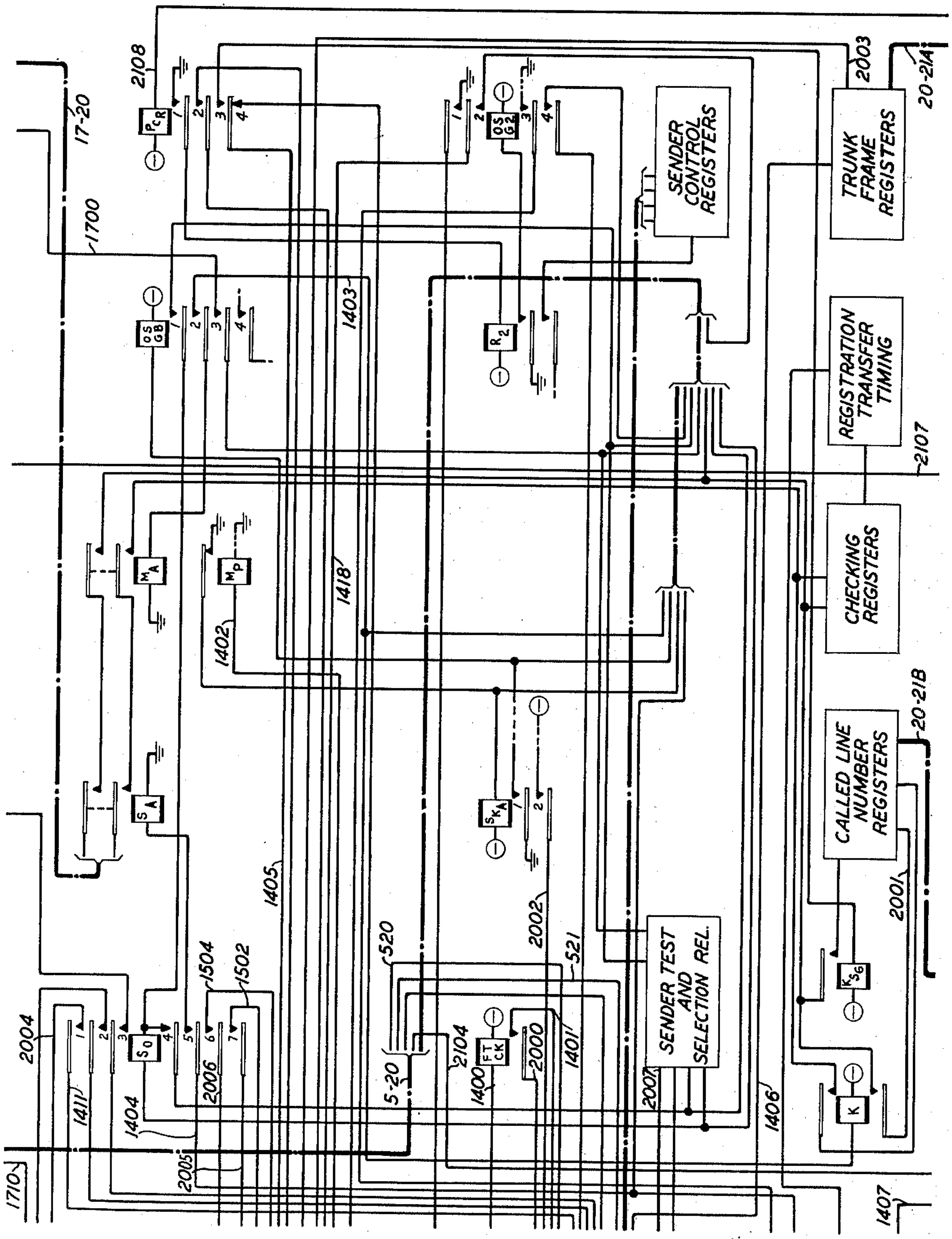

For a local call to a step-by-step office, such as office 510, the marker selects an idle trunk, such as trunk 511, a sender equipped to generate dial-type pulses, such as the sender shown in Figs. 11, 13 and 16 to 19, connects with the sender by means of a sender connector as shown in Fig. 20, and controls the connection of the sender with the trunk by means of the sender link shown in Fig. 10.

Figures 21, 22:
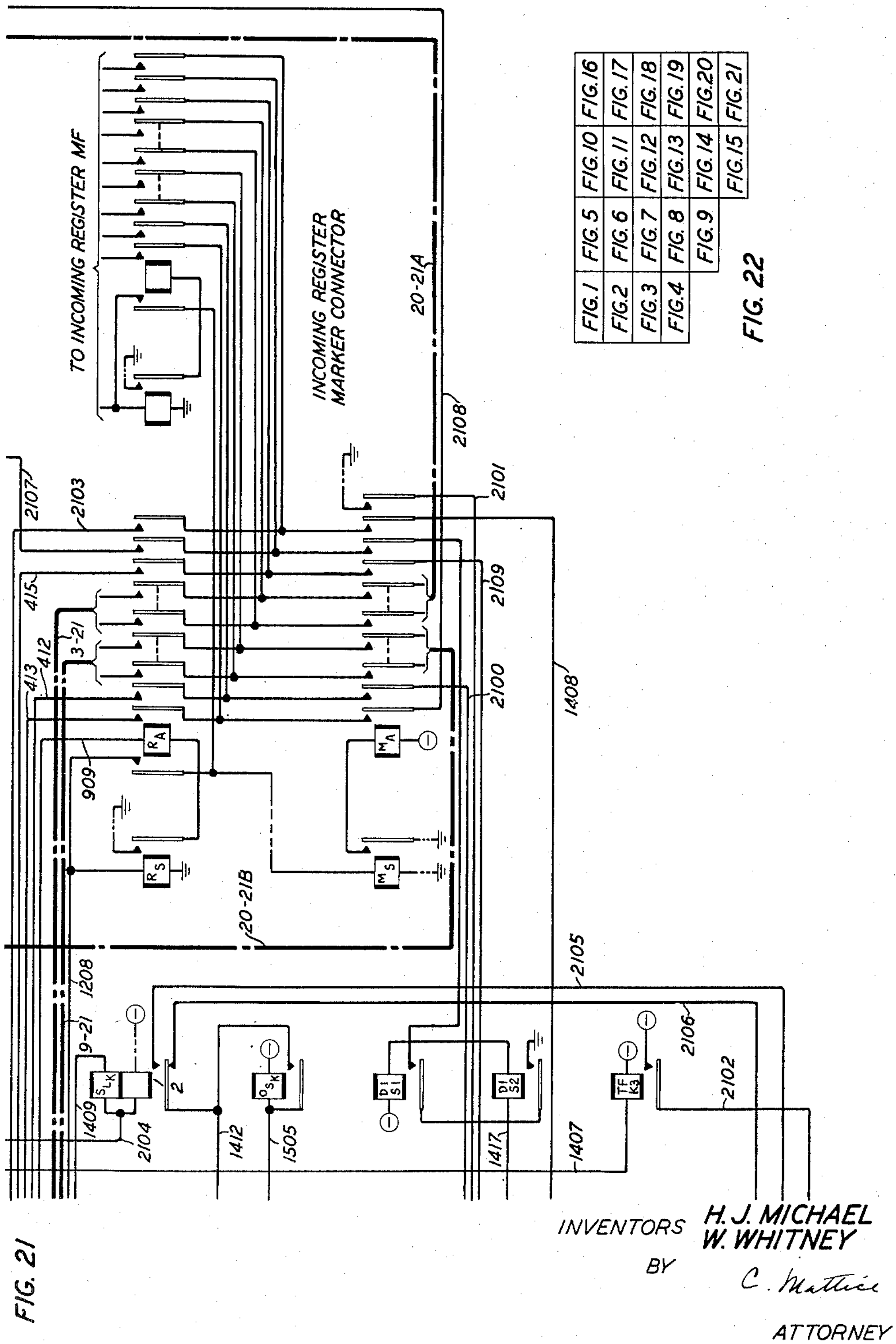
Fig. 21 shows a marker connector for connecting the marker with an incoming register.
Fig. 22 shows the manner in which Figs. 1 to 21 should be arranged.

An incoming call from panel office 501 causes the seizure of an incoming trunk circuit, such as trunk circuit 512, which responds to such seizure to connect with an incoming register, equipped to employ revertive pulses such as register 513, through an incoming register link individual to that type of register, such as link 514. The register receives the designation of the wanted line by means of revertive pulses transmitted from the panel office over the trunk and then calls in a marker by means of a marker connector (not shown) similar to the marker connector of Fig. 21 and transfers the designation to the marker. The marker then operates the trunk and line switches to connect the trunk with the wanted line and releases.

Figure 2:
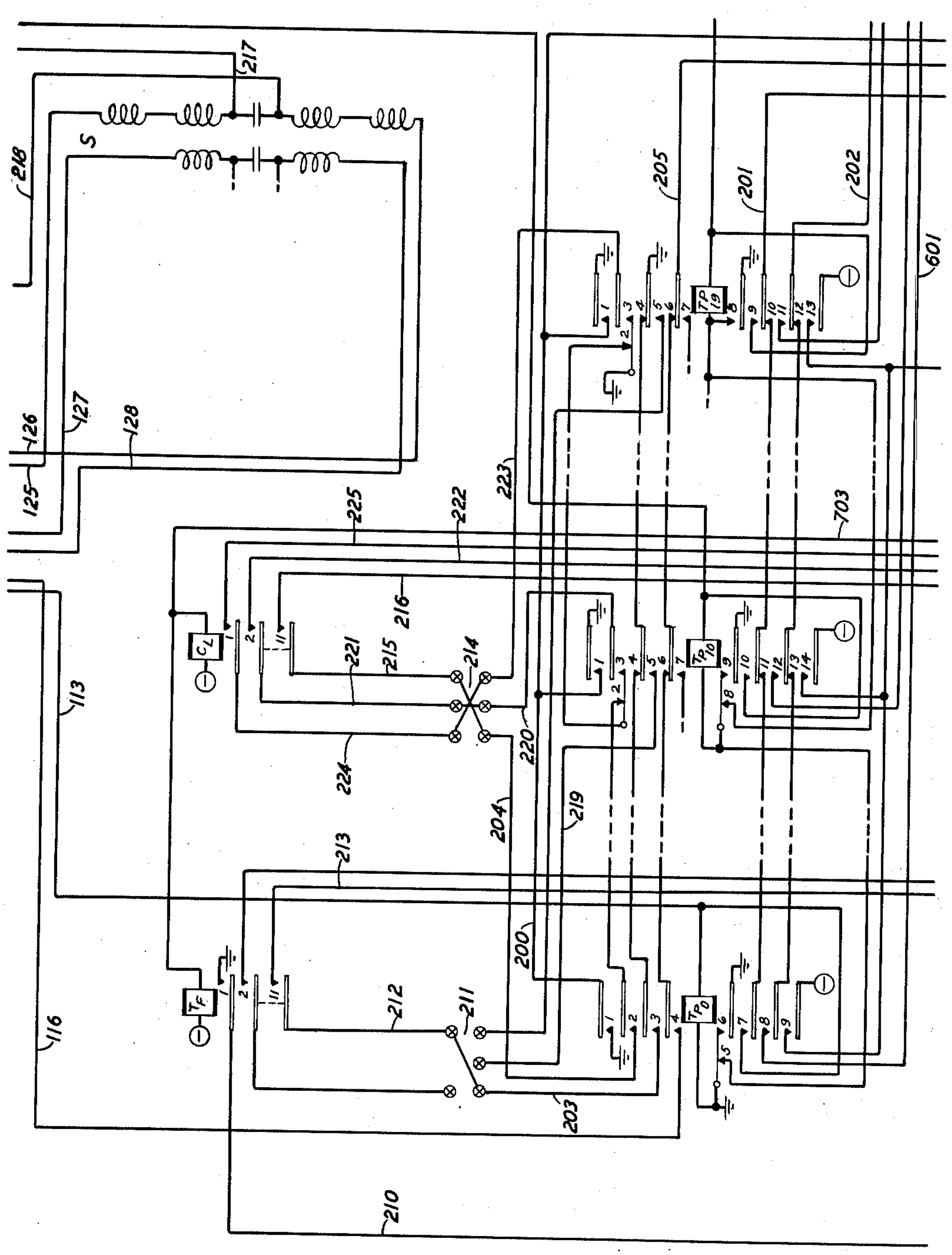
Figs. 2, 6 and 7 show a register link circuit for connecting an idle multifrequency incoming register with a trunk circuit.
Figure 3:
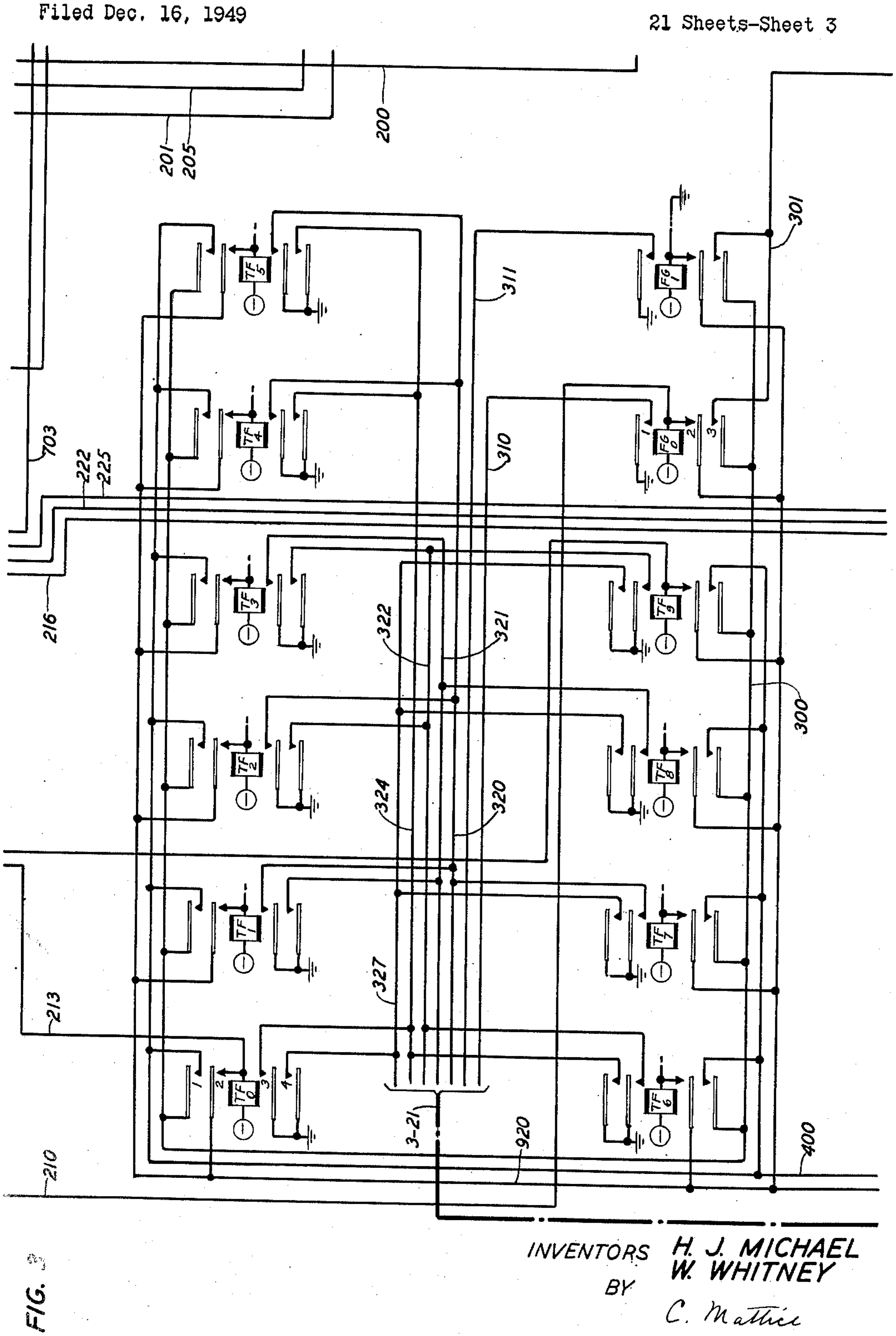
Figs. 3, 4, 8, 9 and 12 show an incoming register.
Figure 4:
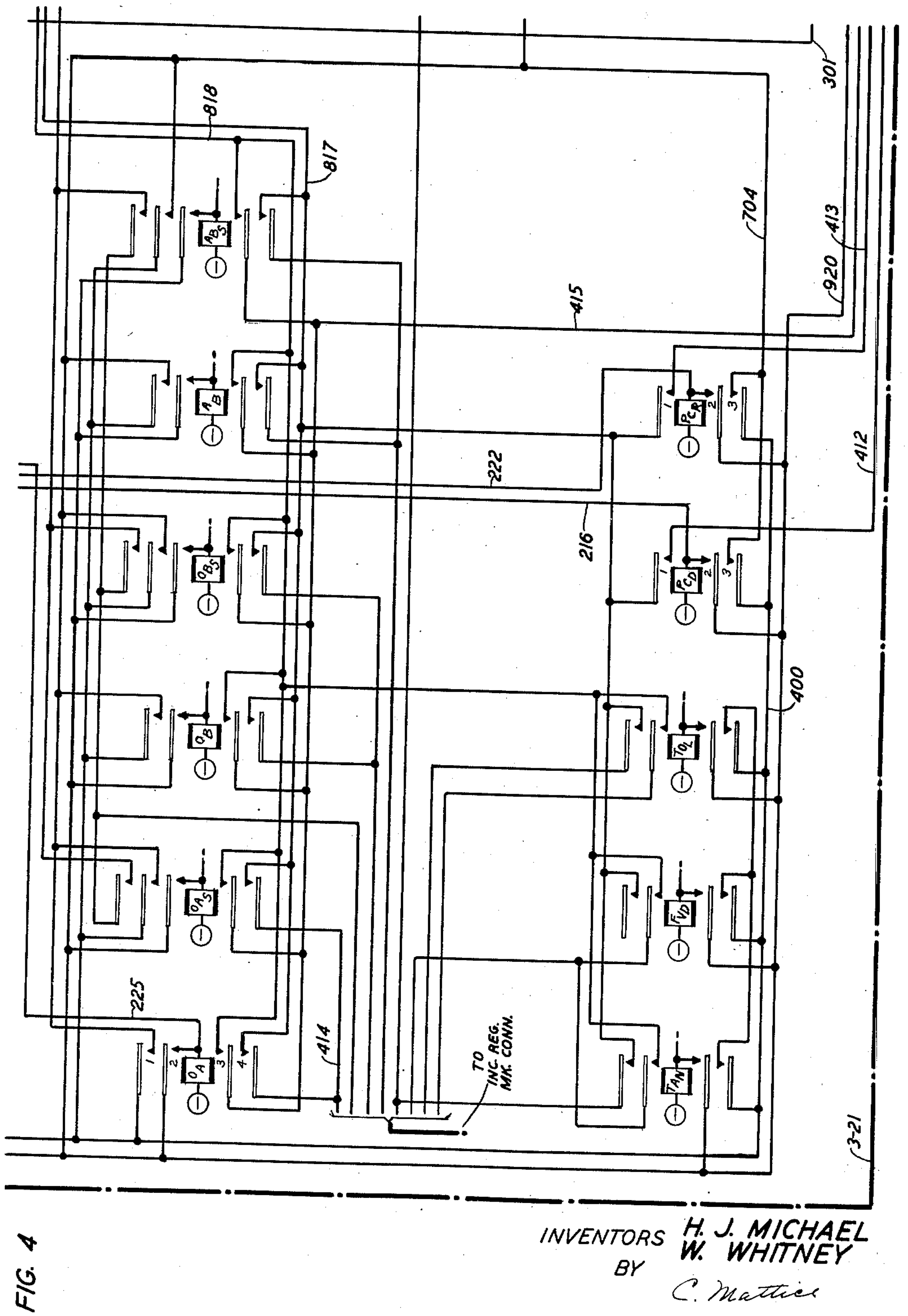
Figure 6:
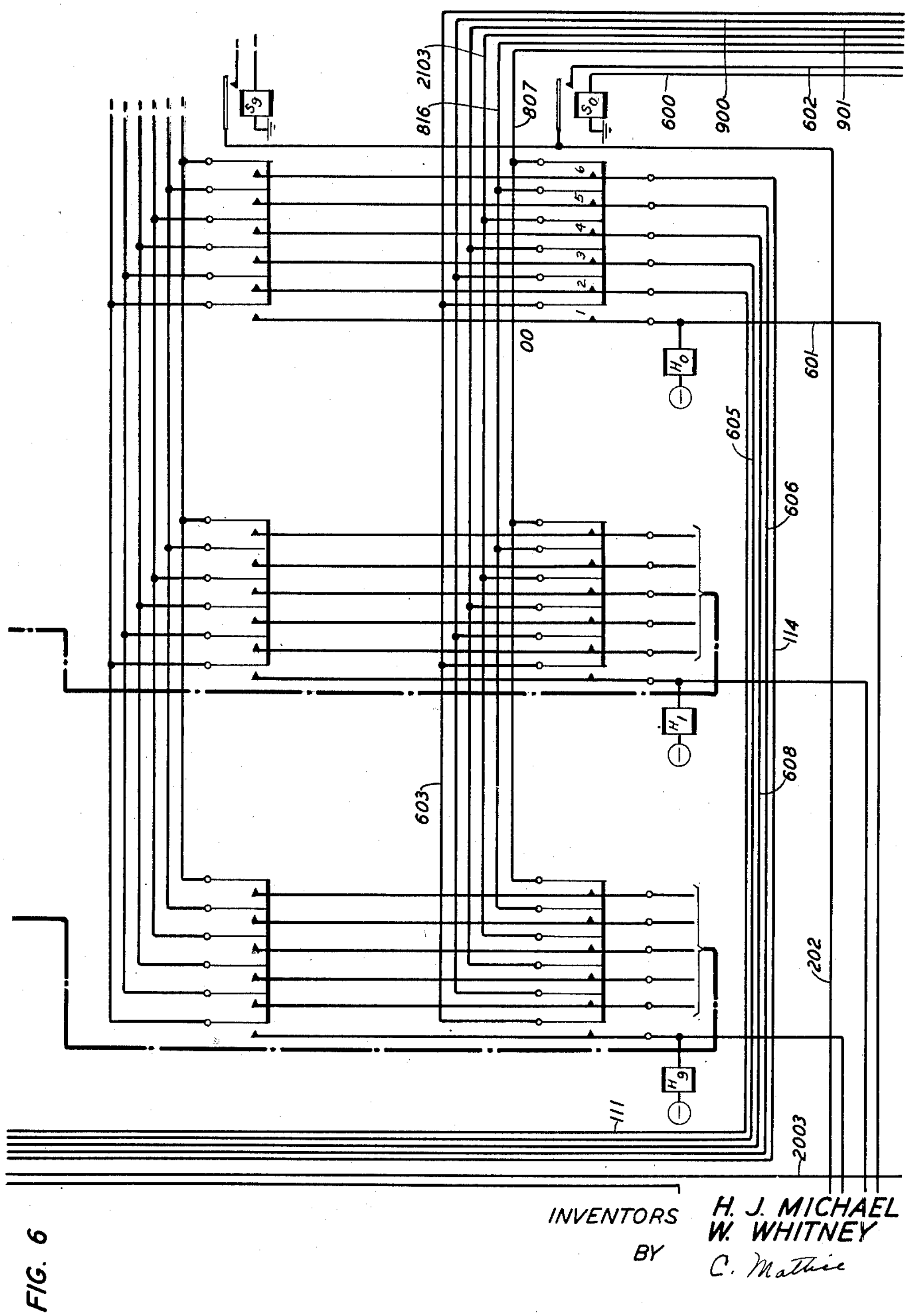
Figure 7:
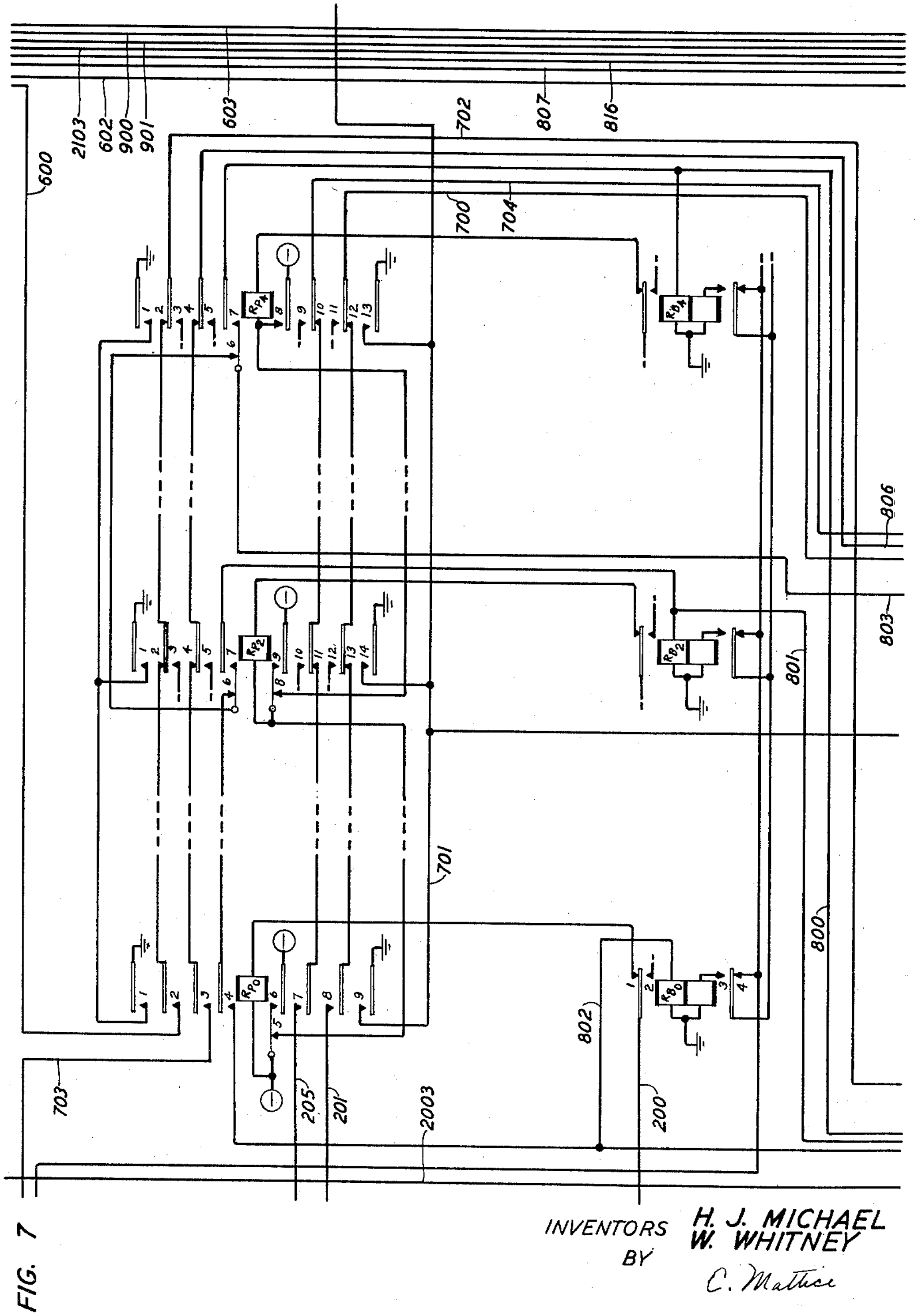
Figure 8:
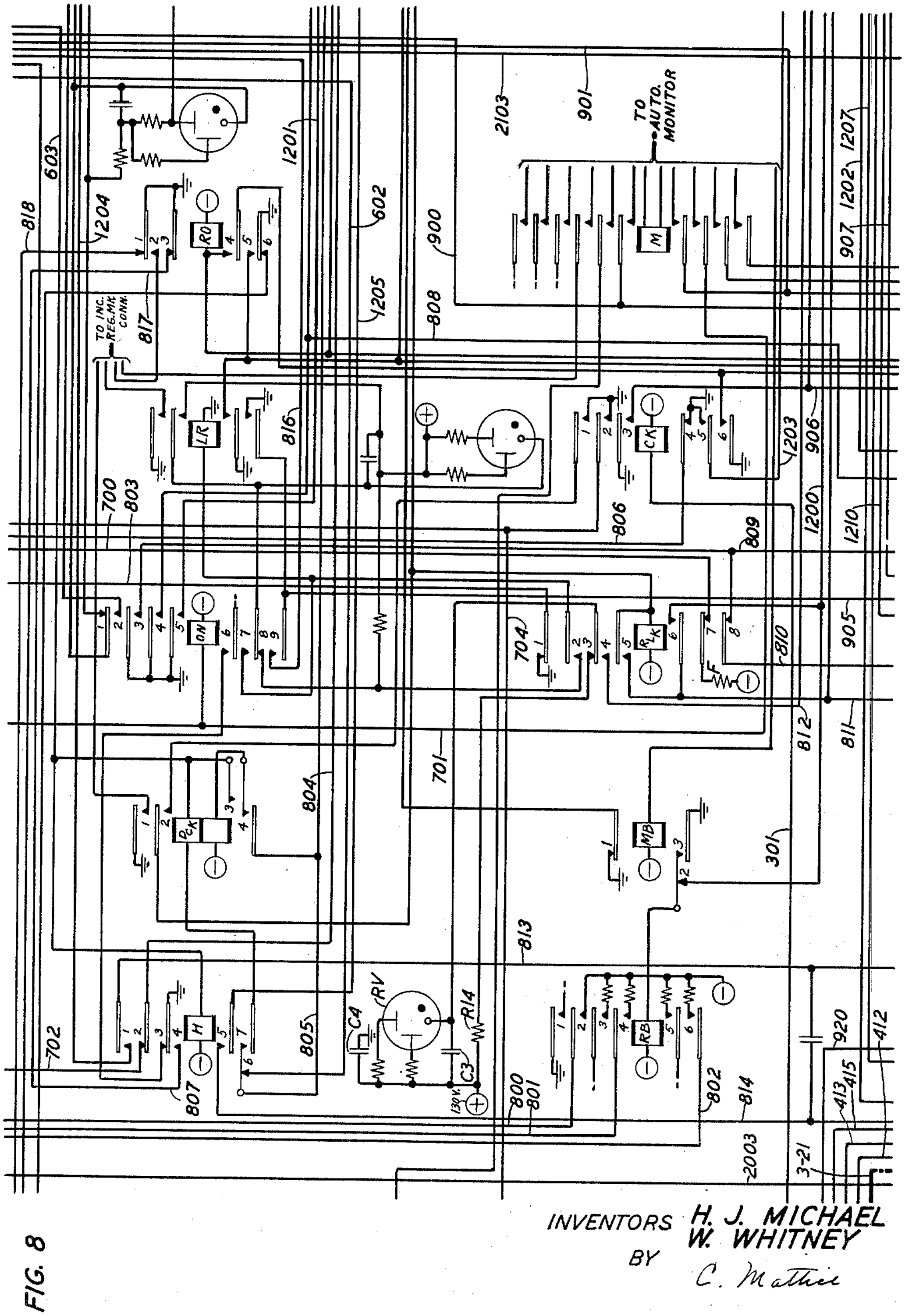
Figure 9:
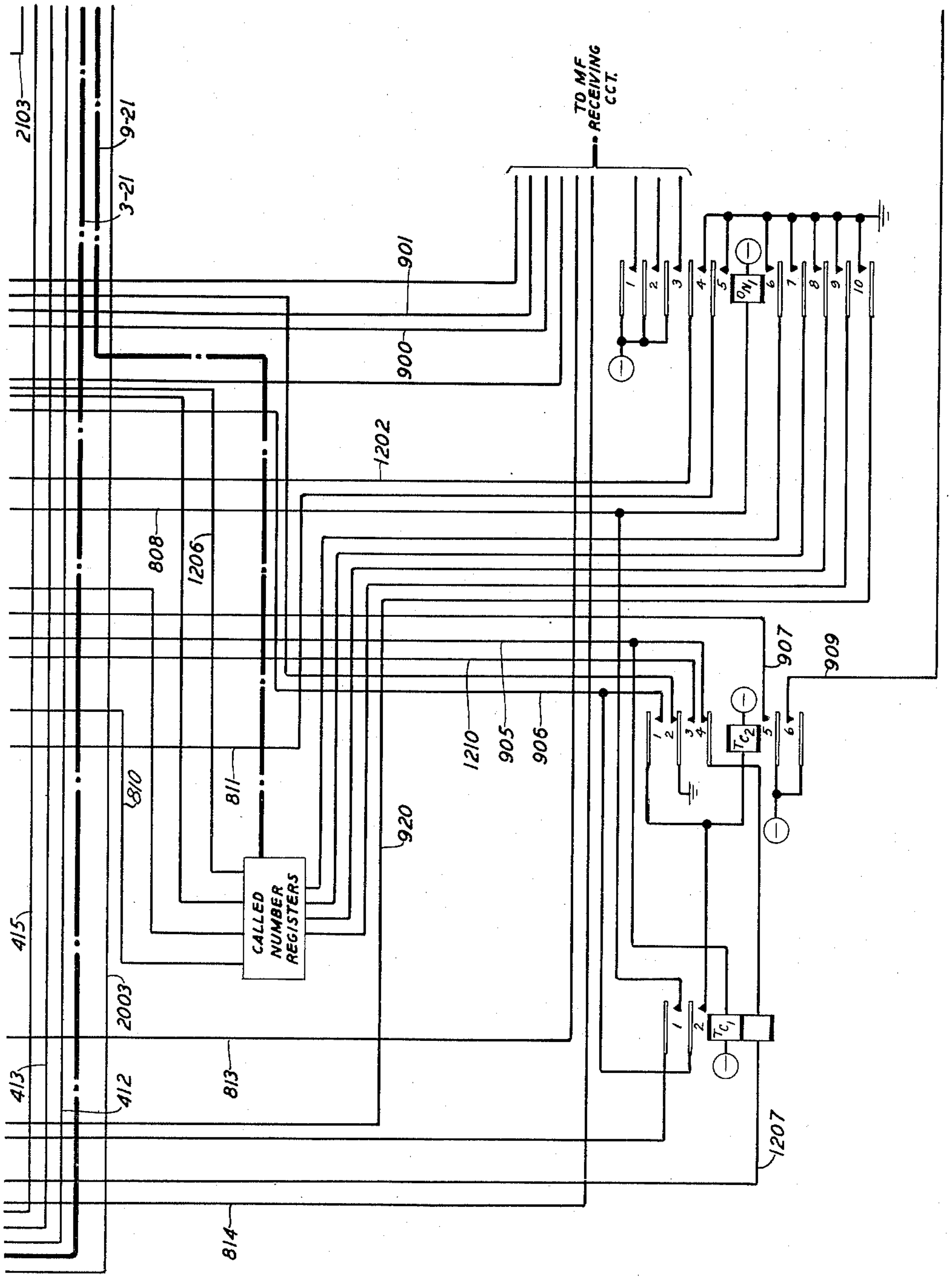

Similarly, an incoming call from cross bar office 506 causes the seizure of an incoming trunk circuit such as trunk 515, which responds to seizure to connect with an incoming register, equipped to receive multifrequency pulses such as the incoming register shown in Figs. 3, 4, 8, 9 and 12, by means of the incoming register link shown in Figs. 2, 6 and 7. The register receives the designation of the wanted line by means of multifrequency pulses transmitted from office 506 and then operates the marker connector of Fig. 21 to call in a marker which completes the call.

An incoming call from step-to-step office 510 causes the seizure of an incoming trunk such as trunk 516, which connects with an incoming register such as register 517, equipped to receive dial-type pulses, by means of an incoming register link individual to dial-type registers, such as link 518. The register 517 receives the designation by means of dial-type pulses generated at office 510 and transmitted over trunk 516 to the register.

Located in the same building as the local office above described may be an operator position 100 at which the operators are provided with cords 101, and key-sets 102. Appearing before these operators are the jacks of trunks leading to various distant offices, jack 103 being connected through trunk circuit 519 with panel office 501, jack 104 connected through trunk circuit 106 with the cross bar office 506 and jack 105 connected through the trunk circuit shown in Fig. 1 to the step-by-step office 510.

Since the operator's position has a multifrequency key-set, on calls for office 506, the designations may be transmitted over trunk 106 directly to the cross bar office.

Figure 1:
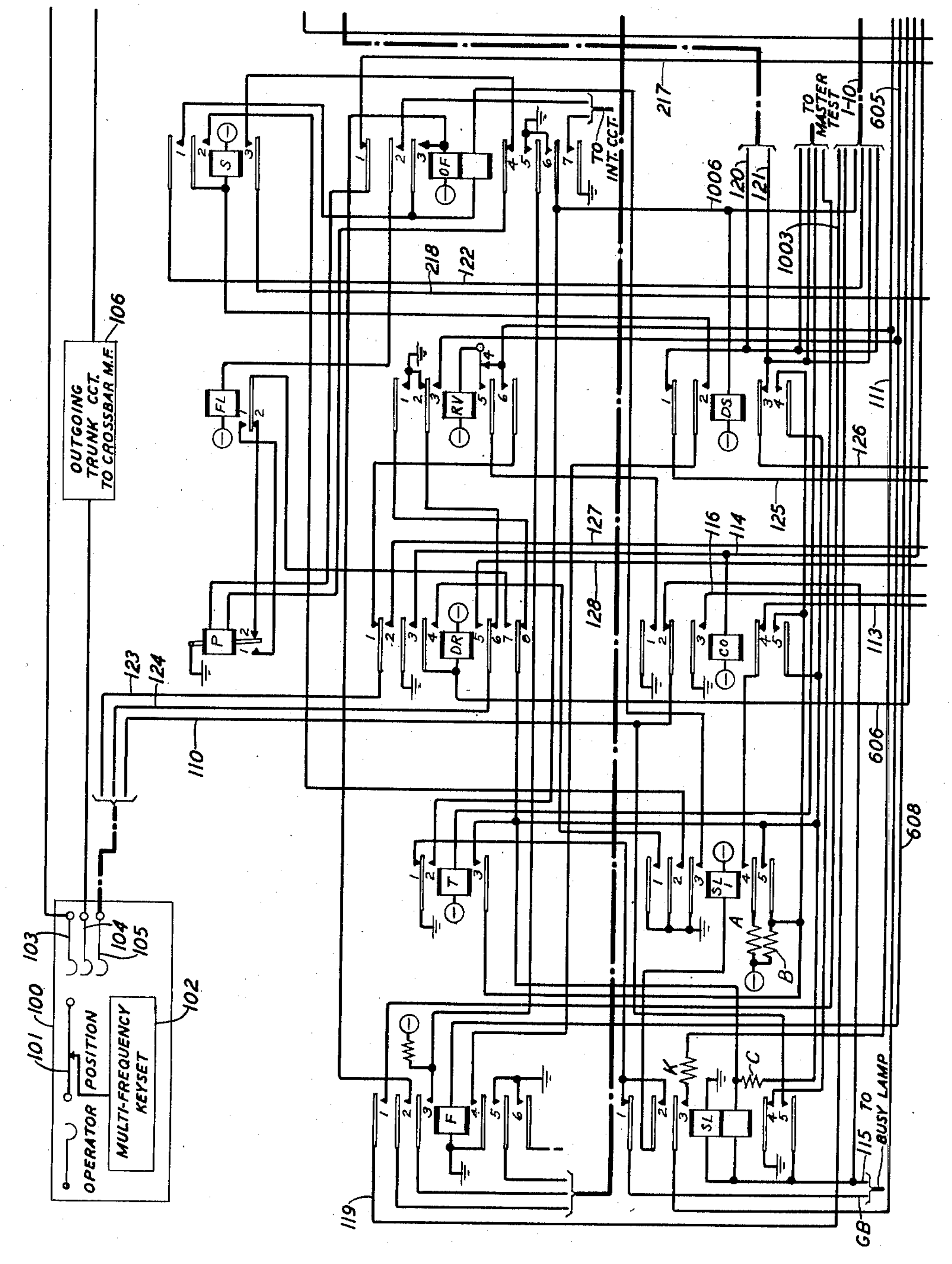
Fig. 1 shows in schematic form an operator's position equipped with a multifrequency key-set, a trunk circuit leading to a cross bar office and, in detail, a trunk circuit for extending a connection to a step-by-step office, a part of the latter trunk circuit extending into Fig. 2.

If a call is to be extended to the step-by-step office 510, the multifrequency pulses must be changed to dial-type pulses and, therefore, when the operator plugs into jack 105, seizing the trunk circuit of Fig. 1, the trunk circuit is arranged to operate the incoming register connector of Figs. 2, 6 and 7, to connect an idle multifrequency register, for example, the register shown in Figs. 3, 4, 8, 9 and 12 with the trunk. When the operator operates her key-set the designation is set up in this incoming register, which then calls in a marker and causes the transmission of an indication to the marker that pulse conversion to dial-type pulsing is required. In response to this indication, the marker selects an idle dial-type sender, for example, the sender of Figs. 11, 13 and 16 to 19, connects with the selected sender by means of the sender connector of Fig. 20, transmits the designation from the incoming register to the outgoing sender, controls the connection of the sender with the trunk circuit of Fig. 1 and releases without performing any switch operating functions. These operations are described in detail hereinafter.

Similarly, when a call is to be extended to a panel office, the operator plugs into jack 103, seizing trunk circuit 519, which connects with a multifrequency incoming register in the same manner as the trunk circuit of Fig. 1. However, the marker now receives an indication that pulse conversion to revertive pulses is required and, therefore, selects an idle revertive pulse sender such as sender 503, connects therewith through sender connector 504, controls the connection of the sender with trunk 519 through sender link 505 and releases without performing any switch operating functions.

It may be noted that similar trunks would be provided for the toll operators to permit completing calls to panel and step-by-step offices.

*Detailed description*

When the operator at position 100 inserts the plug of a cord 101 in jack 105, battery on the sleeve conductor of the cord is connected to conductor 110, completing a circuit over contact 2 of relay CO(1) to ground through the high resistance upper winding of relay SL(1). Relay SL(1) operates in this circuit and locks over its contact 5 to conductor 110 independent of relay CO(1). Relay SL(1) closes a circuit from battery through the winding of relay SL1(1), contact 2 of relay SL(1) to ground at contact 1 of relay T(1). Relay SL(1), at its contact 3, connects resistance K(1) between conductors 111 and 605 for a purpose which will appear hereinafter.

Relay SL1(1) connects battery through resistance B(1), over contact 5 of relay SL1(1), through high resistance C(1) and the lower winding of relay SL(1) to conductor 115 to mark the trunk busy in the lamp indicator. Relay SL1(1) also connects battery through resistance A(1) over its contact 4 and contact 4 of relay CO(1) to the start conductor 113 of the multifrequency register link circuit. Battery on conductor 113 extends through the winding of trunk preference relay TP0(2) to ground. Relay TP0(2) operates and, if no other trunk in the group is seeking a register, is effective to control the seizure of a register.

Trunk preference relays TP0(2) to TP19(2) are each individual to a trunk and are arranged in a chain so that the operation of one trunk preference relay prevents the operation of those having higher numbers. A preference relay having a lower number can operate, but is ineffective until the higher numbered relay releases.

Assuming that relay TP0(2) operates alone, it closes a circuit from ground over its contact 1, conductor 200, contact 1 of register busy relay RB0(7), if the associated register is idle, to battery through the winding of register preference relay RP0(7). The register preference relays RP0(7) to RP4(7) and their associated register busy relays are all associated with the register of Figs. 3, 4, 8, 9 and 12 but are individual to different groups of trunks which may be served by that register. A similar set of register preference relays and register busy relays is provided for each register and the register busy relays associated with each trunk group are arranged in a chain to establish an order of preference for the registers, this order varying with the trunk group. When a register is seized by a trunk group, the associated register busy relays are operated for each group except the seizing group, thereby advancing the preference to the next register in each group.

Assuming that the register shown is idle and, therefore, relay RB0(7) is not operated, the above-traced circuit for relay RP0(7) is completed and relay RP0(7) operates. With relay RP0(7) operated, a locking circuit is closed for relay TP0(2) which may be traced from ground through the winding of relay TP0(2), contact 7 of relay TP0(2), contact 11 of relay TP10(2) and the other intermediate trunk preference relays, contact 10 of relay TP19(2), conductor 201, contact 8 of relay RP0(7), contacts 13 of relay RP2(7) and the other intermediate register preference relays, contact 12 of relay RP4(7), conductor 700, contact 7 of relay RLK(8), resistance F(8) to battery.

At its contact 9, relay RP0(7) connects ground to conductor 701 which leads to battery through the winding of relay ON(8) operating that relay to prepare the incoming register for operation. Ground on conductor 701 is also extended over contact 2 of relay TRL(12), contact 3 of relay MRL(12), conductor 1200, contact 2 of relay MB(8) to battery through the winding of relay RB(8). Relay RB(8) connects resistance and battery over its contacts to the windings of all of the register busy relays associated with this register, circuits being shown over contacts 2, 4 and 6 of that relay and conductors 800, 801 and 802 to ground through the upper windings of relays RB0(7), RB2(7) and RB4(7). However, since relay RP0(7) is operated, ground is also connected over contact 1 of relay RLK(8), conductor 803, contacts 6 of relays RP4(7), RP2(7) and the intermediate relays, contact 4 of relay RP0(7) to conductor 802 in shunt of the resistance battery supplied by relay RB(8) to prevent relay RB0(7) from operating.

Relay RP0(7) also closes a circuit from ground through the winding of select magnet S0(6), individual to the incoming register, conductor 600, contact 2 of relay RP0(7), contacts 2 of relays RP2(7), RP4(7) and the intermediate register preference relays, conductor 702, contact 2 of relay H(8), conductor 804, contact 3 of relay TRL(12), resistance SM(12) to battery. The select magnet S0(6) operates in this circuit to prepare the cross-points of the corresponding level of the register link switch for operation. With magnet S0(6) operated, a circuit is closed for hold magnet H0(6) individual to the trunk circuit, which may be traced from battery through the winding of magnet H0(6), conductor 601, contact 8 of relay TP0(2), contacts 13 of relay TP19(2) and the other intermediate trunk preference relays, contact 12 of relay TP19(2), conductor 202, auxiliary contact of select magnet S0(6), conductor 602, contact 6 of relay H(8), conductor 805, contact 7 of relay TRL(12), conductor 1201, to ground at contact 5 of relay ON(8).

Magnet H0(6) operates in this circuit, closing cross-point 00(6) to connect the trunk with the register and extending its operating ground over contact 1 of cross-point 00(6), conductor 603 to battery through the winding of relay H(8). Relay H(8) operates and closes a locking circuit for itself and the hold magnet H0(6) through the upper winding of relay DCK(8), contact 7 of relay H(8), conductor 805 and thence as above traced to ground at contact 5 of relay ON(8). Relay H(8) at its contact 2 opens the circuit of select magnet S0(6) and at its contact 6 opens the operating circuit of magnet H0(6). If no double connection exists, relay DCK(8) operates as soon as the operating ground is disconnected and in turn locks in a circuit from battery through its lower winding and over its contact 4 to ground on conductor 805, and over its contacts 3 and 4 connects ground from conductor 805 to conductor 603. If a false double connection exists, and ground is connected to conductor 603 by some other register, relay DCK(8) cannot operate and the register cannot function.

In the meantime, a registration has been set up of the trunk frame number and of the class of the calling trunk. As soon as relay RP0(7) operates, it closes a circuit from ground over contact 4 of relay CK(8), conductor 806, contacts 4 of relays RP4(7), RP2(7) and the intermediate register preference relays, contact 3 of relay RP0(7), conductor 703, to battery through the windings of relays CL(2) and TF(2).

Relay TF(2), at contact 1 connects ground to conductor 210, operating relay FG0(3) to identify the group of frames in which the particular frame is located. Contacts of the trunk preference relays are cross-connected at rack 211 to the armatures of relay TF(2) in accordance with the number of the trunk link frame on which the associated trunk is located. Assuming that the trunk under consideration is located on frame 0, the cross-connection at rack 211 would be as shown, and a circuit is closed from ground over contacts 4 of relays TP19(2), TP10(2) and the intermediate trunk preference relays, contact 3 of relay TP0(2), conductor 203, cross-connected at rack 211 to conductor 212, contact 11 of relay TF(2), conductor 213 to battery through the winding of relay TF0(2).

Similarly, a circuit is closed from ground over contacts 2 of relays TP19(2) and TP10(2) and the intermediate trunk preference relays, contact 2 of relay TP0(2), conductor 204 which is cross-connected at rack 214 to conductor 215, over contact 11 of class relay CL(2), conductor 216, winding of class relay PCD(2) to battery.

When relay H(8) operates as above described, it closes a circuit from ground over its contact 4, conductor 807, contact 6 of cross-point 00(6), conductor 114 to battery through the winding of relay C0(1) in the trunk circuit.

With relay C0(1) operated in the trunk circuit and one frame group, trunk frame and class relay operated in the register, a checking circuit is closed, which may be traced from ground over contact 3 of relay C0(1), conductor 116, contact 4 of relay TP0(2), contacts 6 of relays TP10(2), TP19(2) and the intermediate trunk preference relays, conductor 205, contact 7 of relay RP0(7), contact 11 of relay RP2(7) and the intermediate register preference relays, contact 10 of relay RP4(7), conductor 704, contact 3 of relay PCD(4), conductor 400, contact 1 of relay TF0(3), conductor 300, contact 3 of relay FG0(3), conductor 301, to battery through the winding of relay CK(8). Relay CK(8) operates and at its contact 2 connects ground to conductor 704 to lock itself operated after the preference relays release.

When relay ON(8) operates, it connects ground over its contact 4 to conductor 808, which extends to battery through the winding of relay ON1(9), over contact 9 of relay MST(12) to battery through the winding of relay TM1(12) and over contact 7 of relay RV(12) and contact 5 of relay TM(12) to battery through the winding of relay SR(12), thereby operating relays ON1(8), MST(12) and SR(12). In addition relay ON(8) at its contact 3 connects ground to conductor 809, over contact 8 of relay RLK(8), and conductor 810 to the called number registers to prepare the registers for receiving the first digit of the wanted number.

With relay ON1(9) operated, the frame and class relays FG0(3), TF0(3) and PCD(4) lock over conductor 920 to ground at contact 10 of relay ON1(9).

When relays DCK(8) and CK(8) have operated, a circuit is closed from battery through the winding of relay RLK(8), contact 2 of relay DCK(8) to ground at contact 1 of relay CK(8). Relay RLK(8) operates in this circuit and locks over its contact 5 and conductor 811 to ground at contact 5 of relay ON1(9). At its contact 6 relay RLK(8) connects ground on conductor 811 to conductor 1200 to hold relay RB(8) operated and to complete a holding circuit for relay ON(8) which extends from conductor 1200 over contact 3 of relay MRL(12), contact 2 of relay TRL(12) and conductor 701 to battery through the winding of relay ON(8). Relay RLK(8) also disconnects ground from conductor 803 to permit register busy relay RB0(7) to operate and mark this register busy to the associated trunk group. At its contact 7 relay RLK(8) disconnects battery from conductor 700 thereby opening the locking circuit of relay TP0(2) which releases in turn releasing relay RP0(7) and relays TF(2) and CL(2). The control circuit of the register link is now free to control another trunk and register connection. Cross-point 00(6) is held under the control of relay ON(8) as above described, maintaining the connection between the trunk and the register.

Relay RLK(8) starts a timing operation to insure that a stable condition exists before the transmission of the start pulsing signal. Tube RV(8) is employed for this purpose. +130-volt battery is connected to one side of condenser C3(8) which is connected across the control gap of tube RV(8), but with relay RLK (8) non-operated, condenser C3(8) is held discharged over contact 3 of relay RLK(8) and resistance R14(8). When relay RLK(8) operates, it opens this discharge circuit and extends to the other side of condenser C3(8) over its contact 4, conductor 812, upper winding and contact 6 of relay RV(12), conductor 1202, to ground at contact 4 of relay ON1(9). Condenser C3(8) charges in this circuit and after an interval of about 0.2-second, the voltage across the condenser reaches the breakdown potential of tube RV(8) and the control gap of the tube breaks down, permitting relay RV(12) to operate across the main gap. Relay RV(12) closes a locking circuit for itself from battery through its lower winding and over its contact 8, conductor 1203 to ground at contact 5 of relay CK(8). It then opens its operating circuit at its contact 6, to quench tube RV(8).

With relay RV(12) operated, ground through the upper winding of relay A(12) is connected over contact 3 of relay RV(12), contact 6 of relay MST(12), conductor 1204, contact 1 of relay H(8), conductor 813, which is connected through one winding of the input coil of the multifrequency receiving circuit to conductor 900, contact 2 of cross-point 00(6), conductor 111, contact 4 and winding of relay RV(1) to battery. Relay RV(1) operates in this circuit, locks over its contact 5 to ground at contact 1 of relay C0(1) and extends conductor 111 over its contact 6, contact 1 of relay DR(1), conductor 123 and over the tip of jack 105 and cord 101 to the multifrequency key-set 102, which the operator connects to the cord when she plugs into the trunk jack.

With relay RV(1) operated, a circuit is closed from battery through the lower winding of relay A(12), contact 5 of relay RV(12), contact 7 of relay MST(12), conductor 1205, contact 5 of relay H(8), conductor 814, which is connected through a second winding of the input coil of the multifrequency receiving circuit to conductor 901, contact 3 of cross-point 00(6), conductor 605, contact 3 of relay RV(1), contact 6 of relay DR(1), conductor 124 and over the ring of jack 105 and cord 101 to the multifrequency key-set 102.

For a detailed disclosure of a multifrequency key-set, a multifrequency receiving circuit and suitable registers for registering a designation as received by a multifrequency receiving circuit, reference may be made to Patent 2,382,893, granted to B. McKim et al., August 14, 1945.

With relay RV(1) operated, ground is connected over contact 1 of relay RV(1), contact 8 of relay DR(1) to the lower winding of relay SL(1) in shunt of battery through high resistance C(1) and through the lower winding of relay SL(1) over contact 5 of relay SL(1) to sleeve conductor 110. The closure of this circuit lights a lamp at the operator's position as an indication that the register is ready to receive the designation.

Relay A(12) operates in series with relay RB(1), as above described, closing a circuit from ground at contact 4 of relay ON(8), conductor 808, contact of relay A(12), to battery through the winding of relay SR(12) to hold that relay operated after its original operating circuit is opened by the operation of relay RV(12), relay SR(12) being slow to release to cover the interval between the operation of relay RV(12) and the operation of relay A(12). If relay A(12) fails to operate, the release of relay SR(12) causes the register to release as for an abandoned call.

With relay RV(1) operated, resistance K(1) remains connected between conductors 111 and 605, the circuit extending from conductor 111, resistance K(1), contact 3 of relay SL(1), to conductor 605. This connection serves to hold relay A(12) operated during pulsing.

The operator now operates her key-set to send out coded multifrequency pulses corresponding to the wanted number.

When the designation has been completely set up on the called number registers of the incoming register, ground is connected to conductor 1206, completing a circuit through the winding of the marker start relay MTS(12) to battery. However, before a marker can be seized, it is necessary to transfer supervision back to the trunk. Therefore, relay MST(12) at its contacts 6 and 7 disconnects relay A(12) from the conductors 1204 and 1205 and closes a circuit from ground over its contact 1, conductor 1207 through the lower winding of relay TC1(9), contact 4 of relay TC2(9) to conductor 905. Conductor 905 extends to battery through the upper winding of relay TC1(9) and over contact 9 of relay ON(8), conductor 816, contact 5 of crosspoint 00(6), conductor 606 to battery through the winding of relay DR(1) in the trunk circuit. Relay DR(1) operates in this circuit, but relay TC1(9) is differentially wound and does not respond to the closure of the above-traced circuit. Relay DR(1) locks over its contact 4 to ground at contact 1 of relay SL1(1) and the connection of direct ground to the conductor 606 deenergizes the lower winding of relay TC1(9) causing the latter relay to operate as an indication that relay DR(1) is operated and locked.

With relay TC1(9) operated, a circuit is closed from battery through the winding of relay TC2(9), contact 2 of relay TC1(9), conductor 906 to ground at contact 3 of relay CK(8) or contact 5 of relay MST(12). Relay TC2(9) connects battery over its contact 5, conductor 907, contact 1 of relay MRL(12), contact 1 of relay TRL(12) to conductor 1208 leading to ground through the winding of relay RS(21) in the incoming register marker connector operating relay RS(21). Relay TC2(9) also connects battery to conductor 909 completing a circuit, with relay RS(21) operated, through the winding of multicontact relay RA(21) to ground over the contact of relay RS(21). With multicontact relay RA(21) operated, battery on conductor 1208 is extended over preference circuits to ground through the winding of the marker select relay MS(21) individual to the first idle marker. Relay MS(21) operates, in turn operating multicontact relay MA(21). With multicontact relays RA(21) and MA(21) operated the incoming register is connected to the marker over a large plurality of circuits.

Over certain of these circuits the designation set up on the called number registers of the incoming register (Fig. 9) is transmitted by way of cable 9—21, contacts of relays RA(21) and MA(21), cable 20—21B to the called line number registers of the marker (Fig. 20).

Three of these circuits serve to set the trunk frame registers of Fig. 20 to inform the marker as to the location of the trunk and may be traced respectively from ground at contact 1 of frame group relay FG0(3) to conductor 310, from ground at contact 3 of trunk frame relay TF0(3) to conductor 324 and from ground at contact 4 of relay TF0(3) to conductor 327, and thence through cable 3—21, over contacts of relays RA(21) and MA(21), through cable 20—21A to the trunk frame registers of the marker.

The class relay PCD(4) closes a circuit which may be traced from ground over contact 3 of relay R0(8), conductor 817, contact 1 of relay PCD(4), conductor 412, over contacts of the marker connector relays RA(21) and MA(21), conductor 2100 to battery through the winding of relay PCD(14) in the marker, to inform the marker that this is a call requiring pulse conversion.

Relay PCD(14) at its contact 1 closes a direct circuit for operating the corresponding route relay R1(14). Relay R1(14) immediately initiates the selection of an outgoing sender equipped to transmit dial-type pulses, by operating an out sender group relay OSG1(14) associated with senders of the desired type. Relay OSG1(14) operates relay OGC(14) and relay SON(14) directly and operates relay OSC(14) over contact 1 of relay RSC(14). As soon as relay OSC(14) operates, it closes a circuit from ground at a contact of relay MA(21) in the marker connector, conductor 2101, contact 1 of relay OGC(10), contact 2 of relay PCD(14), windings of relays PCL1(14), PCL2(14) and PCL3(14) to battery. Relays PCL1(14), PCL2(14) and PCL3(14) operate in this circuit to modify the marker circuits for handling a pulse conversion call, relay PCL1(14) at its contact 1 closing a locking circuit for these three relays to off-normal ground. Relay PCL3(14) at its contact 2 connects ground to conductor 1400 to operate frame test check relay FTCK(20).

A sender, such as the sender shown in Figs. 11, 13 and 16 to 19, when idle, connects ground over contact 2 of relay MB(17) and contact 2 of relay SB(17) to a group busy conductor 1710 and over contact 1 of relay MB(17) and contact 1 of relay SB(17) to an individual busy conductor 1709.

Relay OSG1(14) extends the group busy conductor 1710 of the corresponding sender group over its contact 3 to battery through the winding of relay SIA(14), relay SIA(14) operating if there is an idle sender in the group as indicated by the connection of ground to conductor 1710. With relay SIA(14) operated a circuit is closed for seizing the sender connector having access to the senders of the selected group. This circuit may be traced from battery over contact 1 of relay OSC(14), conductor 1401, contact of relay FTCK(20), conductor 2000, contact of relay SIA(14), contact 1 of relay OSG1(14), conductor 1402, to ground through marker preference relay MP(20) through the usual preference circuits. Relay MP(20) operates relay SKA(20) to indicate that the sender connector has been seized. Relay SKA(20) at its contact 1 closes a circuit for sender group relay OSGB(20) in the sender connector.

The marker then tests for and selects an idle outgoing sender by means of its sender test and selection relays (Fig. 20), after which it operates relay S0(20) in the sender connector, relay S0(20) being individual to the particular marker and sender to be connected together. Relay S0(20) locks over its contact 4 under the control of the sender test and selection relays of the marker. As soon as relay OSGB(20) is operated, a circuit is closed from battery over contact 2 of relay OSC(14), conductor 1403, contact 2 of relay OSGB(20) to ground through the winding of multicontact relay MA(20), operating the latter relay. With relay S0(20) operated, a circuit is closed from battery over contact 3 of relay OSC(14), conductor 1404, contact 5 of relay S0(20) to ground through the winding of multicontact relay SA(20). With relays SA(20) and MA(20) operated a plurality of circuits are closed for transferring information from the marker to the sender. With relay, S0(20) operated, a circuit is closed from ground over contact 1 of relay SLK2(15), conductor 1502, contact 7 of relay S0(20) in the sender connector, conductor 2005, to battery through the winding of relay ON1(11) of the sender to prepare the sender for operation.

Relay OGC(14) closes a circuit from ground over its contact 2, contact 2 of relay RSC(14), conductor 1405, contact 4 of relay PCR(20) to battery through the winding of relay K(20). With relay K(20) operated a plurality of conductors represented by conductor 2001 which are grounded by part of the called line number registers and a plurality of the conductors included in cable 20—21B are extended to the checking registers to set them and over contacts of relays MA(20) and SA(20) of the sender connector through cable 17—20 to the called number registers of the selected sender.

As soon as the sender connector is seized, as indicated by the operation of relay SKA(20) as above described, a circuit is closed for associating the marker with the same trunk which called in the incoming register. It will be remembered that the identity of the frame on which that trunk is located was set up on the trunk frame registers (Fig. 20) of the marker. Relay SKA(20) closes a circuit from battery over its contact 2, conductor 2002, contact 1 of relay PCL2(14), conductor 1406, through the trunk frame registers (Fig. 20) over the start conductor 2003 to the trunk link frame connector (Fig. 5) individual to the trunk link frame with which the trunk of Fig. 1 is associated. When the frame is available and the connector operates, it returns ground to the marker over conductor 520 which extends through cable 5—20, contact 4 of relay PCL3(14), conductor 1407, to battery through the trunk frame check relay TFK3(21), operating the latter relay.

With relay TFK3(21) operated, a circuit is closed from battery over the contact of relay TFK3(21), conductor 2102, contact 7 of relay PCL2(14), conductor 1408, over contacts of relays MA(21) and RA(21) in the incoming register marker connector, conductor 2103, through the incoming register to the incoming register link, contact 4 of cross-point 00(6), conductor 608, to ground through the winding of relay F(1) in the trunk circuit. Relay F(1) operates in this circuit, operating a relay in the trunk link circuit and prepares for the connection of the sender with the trunk.

With the trunk link frame connector operated, the marker operates select magnet S0(10) individual to the selected sender in the sender link of Fig. 10. A circuit is then closed from ground over contact 3 of relay OGC(14), conductor 1409, through the upper winding of sleeve check relay SLK(21) to conductor 2104. Conductor 2104 extends to battery through the lower winding of relay SLK(21), and through cable 5—20 and the trunk link frame conductor to conductor 1002, over the auxiliary contact of select magnet S0(10), conductor 1003, through cable 1—10, contact 1 of relay F(1), conductor 119 through cable 1—10 to battery through the winding of hold magnet H0(10) individual to the trunk of Fig. 1.

Hold magnet H0(10) closes cross-point 00(10) and extends its operating ground over contact 1 of cross-point 00(10), conductor 1004 to battery through the winding of relay ON(11) which supplies additional grounds for the sender operation. Relay ON(11) at its contact 1 closes a holding circuit for relay ON1(11).

Relay SLK(21) also operates in the circuit above traced and closes a circuit from ground over the contact of relay SON(14), conductor 1412, contact 1 of relay SLK(21), conductor 2105 to battery through the winding of relay SLK1(15). Relay SLK1(15) operates in this circuit and locks over its contact 1 to ground on conductor 1412.

Relay ON(11) closes a circuit from ground over its contact 3, conductor 1101, contact 5 of relay AV(10), conductor 1005, contact 6 of relay R0(16) to battery through the winding of relay CT(16). At the same time, conductor 1005 extends over contact 3 of cross-point 00(10) of the sender link, conductor 1006 through cable 1—10, to battery through the winding of relay DS(1) in the trunk circuit. Relays DS(1) and CT(16) operate in these circuits. Relay DS(1) disconnects the outgoing trunk conductors 120 and 121 from the repeating coil S(2), leaving them connected to the sender through the sender link. These circuits will be traced hereinafter. When relay DS(1) operates, ground is extended over contact 4 of relay F(1), contact 2 of relay DS(1), to battery through the winding of relay S(1). Relay S(1) operates in this circuit and locks over its contact 2 to ground at contact 2 of relay SL1(1).

With relay S(1) operated, a circuit is closed from ground at contact 3 of relay SL1(1), through the lower winding of relay OF(1), contact 1 of relay S(1), conductor 122 through cable 1—10, contact 4 of cross-point 00(10), conductor 1007, contact 2 of relay R0(16), contact 6 of relay CT(16) to battery through the winding of relay LR(16). Relay LR(16) operates in this circuit but relay OF(1) does not receive sufficient current to operate at this time.

With relay LR(16) operated, a locking circuit is closed for relay ON(11) and for hold magnet H0(10) which may be traced from conductor 1004 over contact 1 of relay LR(16) and conductor 1100 to ground at contact 2 of relay ON(11).

The closing of this locking circuit causes relay SLK(21) in the marker to release.

With relay SLK1(15) operated, the release of relay SLK(21) closes a circuit from ground to conductor 1412 as above traced, over contact 2 of relay SLK(21), conductor 2106, contact 2 of relay SLK1(15) to battery through the winding of relay SLK2(15). Relay SLK2(15) operates and locks over its contact 4 to ground on conductor 1412. At its contact 1 relay SLK2(15) opens the operating circuit for relay ON1(11) in the sender, leaving that relay held under the control of the trunk. At its contact 2, relay SLK2(15) closes a circuit for operating relay SIK(15).

In the meantime, when relay F(1) operates the relay in the trunk link frame conductor, ground is connected to conductor 521 to transmit to the marker an indication of the class of the trunk. Conductor 521 extends through cable 5—20 to battery through the winding of relay 3FB(15). When relay PCL3(14) operated it closed a circuit from battery through the winding of relay PCCL(15), conductor 1590, contact 1 of relay PCL3(14), conductor 1410 to ground under the control of the class transfer timing circuit. With relay PCCL(15) operated, the operation of relay 3FB(15) closes a circuit from ground over its contact, contact 3 of relay PCCL(15) to battery through the winding of relay PCN2(15) and in parallel therewith over conductor 1501, contact 6 of relay PCL1(14), conductor 1411 over contact 1 of relay S0(20) in the sender connector, conductor 2004 to battery through class relay CL2(10) in the sender.

The marker measures a time interval for the transfer of the line designation to the sender by means of the registration transfer timing circuit of Fig. 20, after which, if the checking registers indicate that the transfer has taken place properly, relay RSC(14) is operated. The operation of relay RSC(14) releases relay OSC(14) which in turn removes the battery supply for relays SA(20), MA(20) and MP(20) causing these relays to release, relay S0(20) remaining operated.

Figure 15:
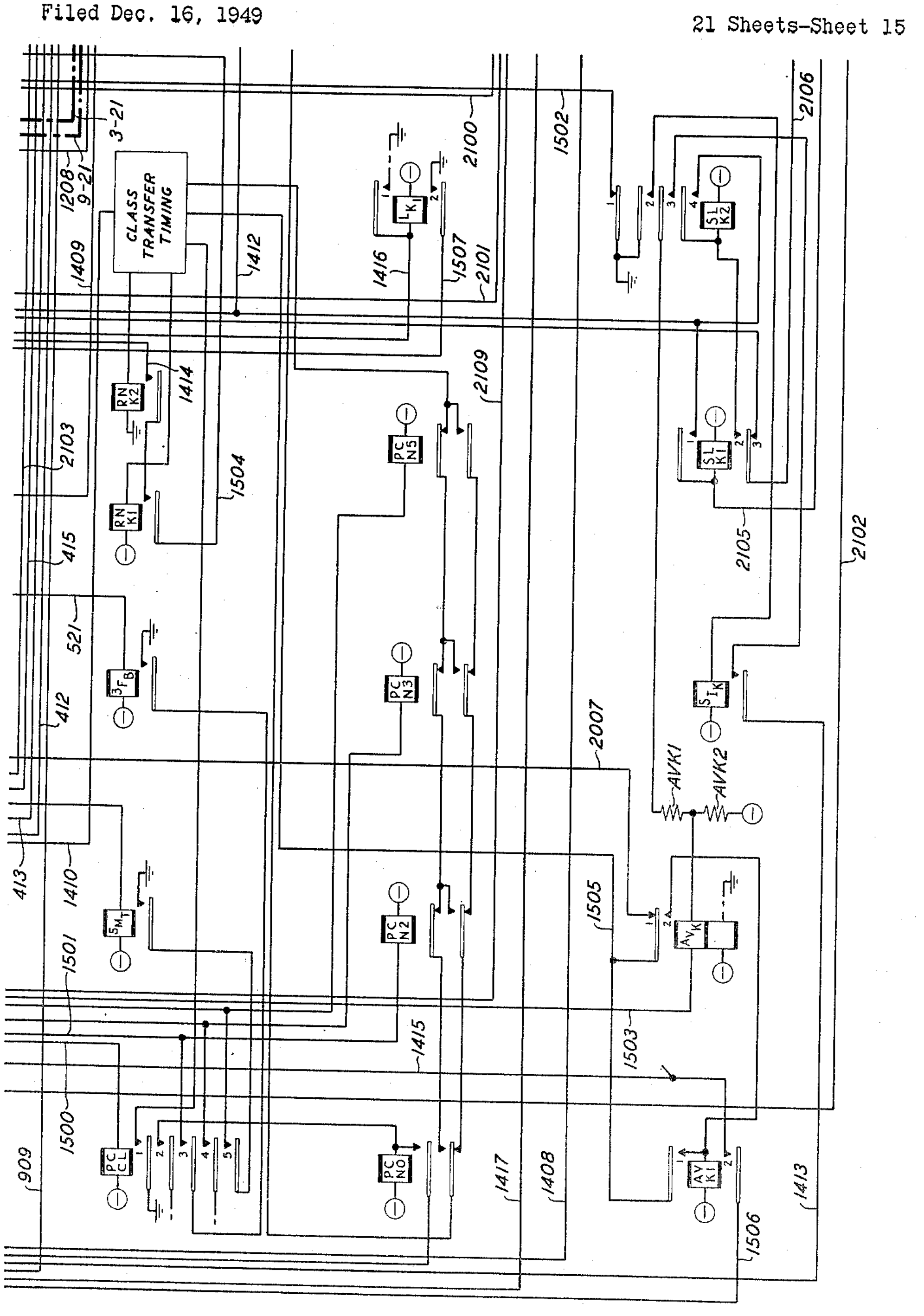
Figure 16:
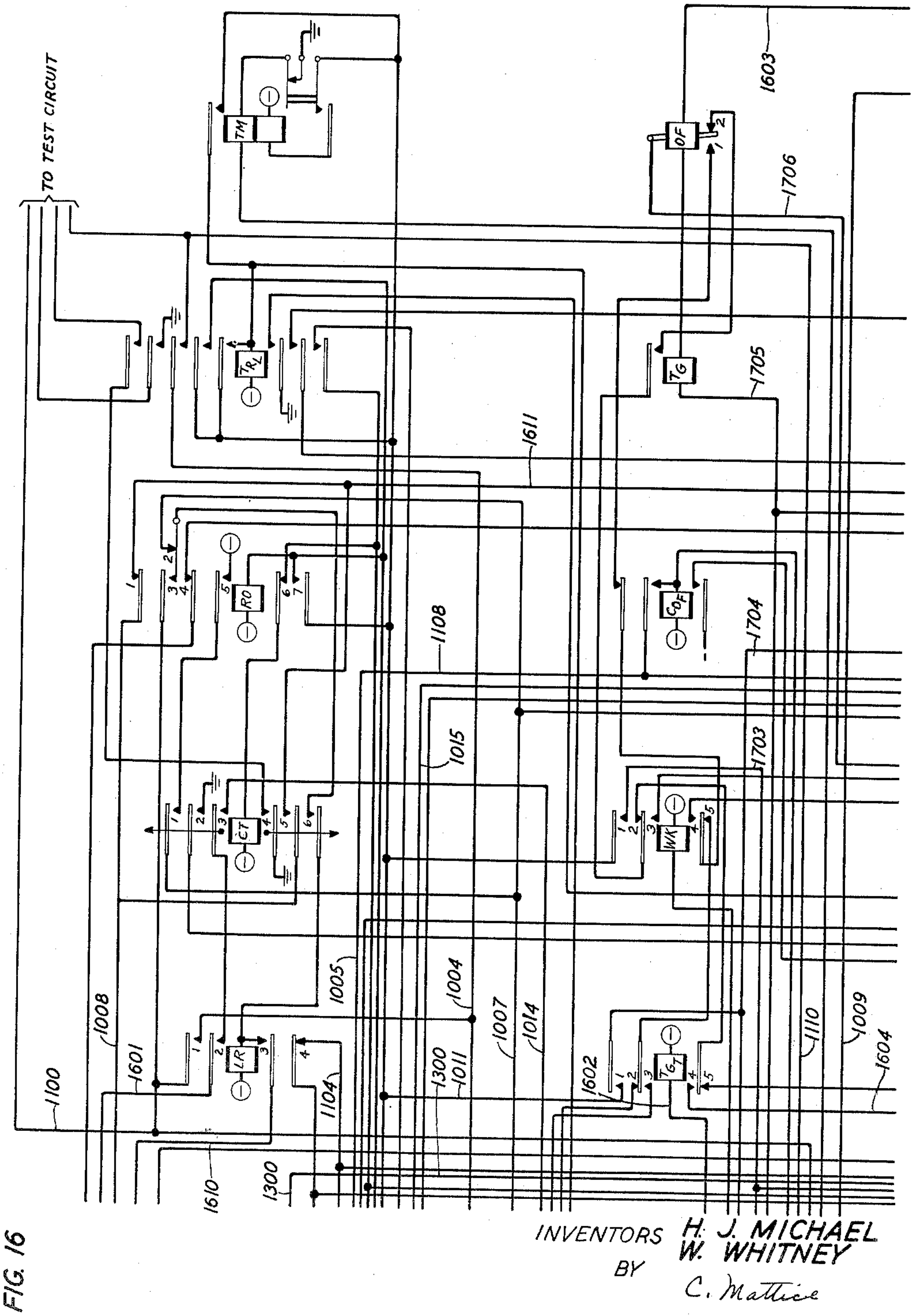
Figure 17:
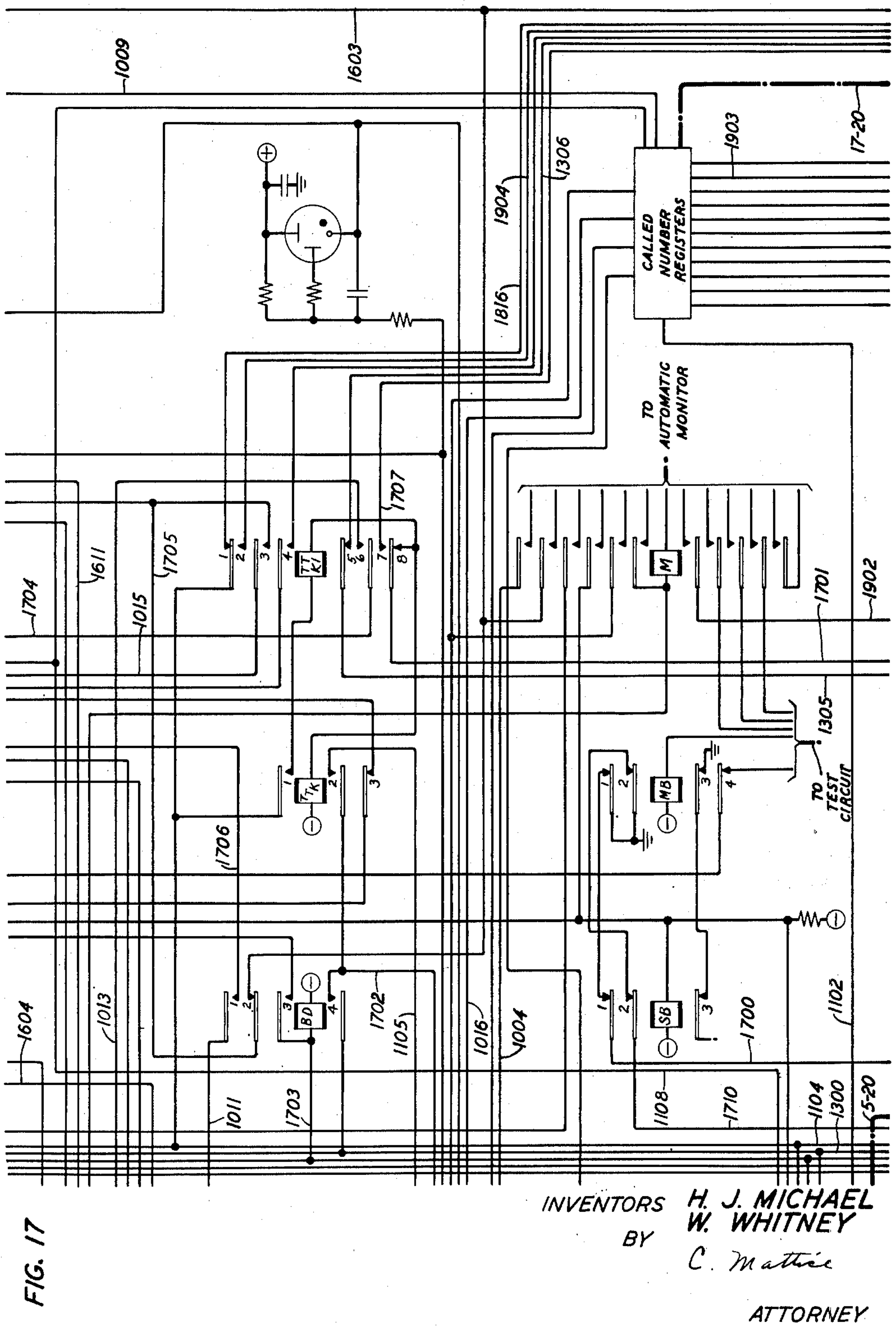

Similarly the marker times and checks the transfer of the class information by means of the class transfer timing circuit of Fig. 15. If the action is satisfactory relays RNK1(15) and RNK2(15) operate.

Relay RSC(14) closes a circuit from ground over its contact 3, contact 6 of relay PCL2(14), conductor 1413, contact of relay SIK, contact 3 of relay SLK2(15) to battery through resistances AVK1(15) and AVK2(15) to provide a reduced battery voltage for relay AVK(15). A circuit is now closed from this reduced battery voltage through the upper winding of relay AVK(15), conductor 1503, contact 3 of relay PCL3(14), conductor 1414, contacts of relays RNK2(15) and RNK1(15), conductor 1504, contact 6 of relay S0(20), conductor 2006 to battery through the winding of relay AV(10) in the sender.

Relay AVK(15) is polarized by a circuit closed by off-normal ground and is energized at this time in the non-operate direction. However, relay AV(10) of the sender operates and locks over its contact 2 and conductor 1008 to ground at contact 1 of relay ON(11). The closure of this locking ground reverses the direction of current flow in the upper winding of relay AVK(15) in the marker, causing that relay to operate.

Prior to the operation of relay AVK(15) a circuit is closed from ground supplied by the sender test and selection relays when the sender is selected, over conductor 2007, contact 1 of relay AVK(15), conductor 1505 to battery through the winding of relay OSK(21). Relay OSK(21) operates and locks to ground on conductor 1412. When, now, relay AVK(15) operates, ground from conductor 1412 is extended over the contact of relay OSK(2), conductor 1505, contact 2 of relay AVK(15) to battery through the winding of relay AVK1(15) operating relay AVK1(15) which locks over its contact 1 to conductor 1505.

Relay AVK1(15) closes a circuit from ground at contact 4 of relay RSC(14), contact 4 of relay PCL2(14), conductor 1415, contact 2 of relay AVK1(15), conductor 1506, contact 3 of relay PCL2(14), conductor 1416 to battery through the winding of relay LK1(15), operating that relay, which locks over its contact 1 to off-normal ground. Relay LK1(15) closes a circuit from ground over its contact 2, conductor 1507, contact 5 of relay PCL2(14), conductor 1417, to battery through the windings of relays DIS2(21) and DIS1(21). With relays DIS1(21) and DIS2(21) operated a circuit is closed from ground over the contacts of these relays, over contacts of relays MA(21) and RA(21), conductor 2107, contact 2 of relay SR(12) in the incoming register to battery through the winding of relay MRL(12) in the incoming register.

Relay MRL(12) at its contact 1 disconnects battery from conductor 1208, thereby releasing relay RS(21) and relay MS(21), in the marker connector. The release of relays RS(21) and MS(21) causes the release of multicontact relays RA(21) and MA(21), completing the release of the marker connector and thereby disconnecting the register from the marker. The release of the marker connector and the operation of relays DIS1(21) and DIS2(21), which have taken place without the marker performing any switch controlling functions, brings about the release of the marker as described in detail in the above-identified Busch patent.

The release of the marker releases the trunk link frame connector of Fig. 5. The release of the marker connector also opens the circuit of relay F(1) releasing the trunk relay in the trunk link frame connector.

In the incoming register, relay MRL(12) locks over its contact 4, conductor 1210 to ground at contact 3 of relay TC2(9). At its contact 2, relay MRL(12) connects ground to conductor 1200 to hold relay RB(8) operated and at its contact 3 opens the holding circuit for relay ON(8). Relay ON(8) releases, in turn releasing the hold magnet H0(6) of the register link and relays H(8), DCK(8) and ON1(9). The release of hold magnet H0(6) opens cross-point 00(6) disconnecting the register from the trunk. The release of relay ON1(9) opens the locking circuits for the trunk frame number relays FG0(3) and TF0(3), class relay PCD(4) and the called number registers all of which now release, in turn opening the circuit of relay CK(8). When relay CK(8) releases it in turn releases relays MST(12), TC2(9), MRL(12) and RB(8), completing the release of the incoming register. Relay RB(8) in releasing, releases the register busy relays RB0(7), RB2(7) and RB4(7) in the register link and the register is thereby made available for reselection.

In the sender, the operation of relay AV(10) closes a circuit from ground at contact 10 of relay ON1(11), conductor 1102, contact 2 of relay TT1(11), conductor 1103, contact 3 of relay AV(10), conductor 1009 to the called number registers to prepare them for sending out the first digit.

When relay ON(11) operates, indicating that the trunk and sender have been connected together, the sender starts a timing operation to measure a predetermined interval before making trunk test to insure that the distant office will be ready for such test.

This timing circuit employs the same pulse generator relays as are used for transmitting the designation which includes the timing relay PG(13), the pulsing relay P(13) and the checking relay CKP(13). Relay PG(13) is a non-biased polarized relay and the windings of relays P(13) and CKP(13) are connected in series with its lower winding.

Relay ON(11) in operating connects ground over its contact 4 to conductor 1104, completing a circuit over contacts 2 and 1 of relay CL4A(13), contact 1 of relay CL5A(13), resistances A(13) and B(13), contact 4 of relay CL5A(13), resistance BA(13) to battery. Reduced battery potential obtained from the point between resistances B(13) and BA(13) is connected over contact 4 of relay CL4A(13) through the windings of relay P(13) and relay CKP(13), lower winding of relay PG(13), conductor 1300, contact 9 of relay TT1(11), contact 1 of relay TT2(11), conductor 1105, contact 2 of relay W(19), contact 2 of relay SP1(19) to ground over conductor 1104. Battery through resistance BE(13) is also connected to conductor 1300 but is shunted by the ground connected to conductor 1300 as above traced. A circuit also extends from conductor 1300 through the upper winding of relay PG(13) and condenser PG(13) to conductor 1104, condenser PG(13) being discharged with ground connected to both conductors. The upper winding of relay PG(13) is also connected through condenser PG1(13), resistance P(13) and over contact 2 of relay CL4A(13) to ground on conductor 1104. Relays PG(13), P(13) and CKP(13) operate in this circuit being so energized that relay PG(13) closes its contact 2, relay P(13) closes its contact 1 and relay CKP(13) closes its contact 1.

Relay ON(11) also closes a circuit from ground at its contact 6 over contact 1 of relay TT1(11) to battery through the winding of relay TT2(11), operating the latter relay. As soon as relay TT2(11) operates, it disconnects ground from conductor 1300 and the direction of current flow in the lower winding of relay PG(13) and relays P(13) and CKP(13) is reversed, relays P(13) and CKP(13) closing their contacts 2. However, condensers PG(13) and PG1(13) now charge through the upper winding of relay PG(13), this charging current opposing the current flowing through the lower winding and holding contact 2 closed for a time. When the charging current dies down, relay PG(13) closes its contact 1. Ground from conductor 1104 is now connected over contact 1 of relay PG(13) to conductor 1300 in shunt of battery through resistance BE(13) and relay PG(13) tends to open its contact 1, but condensers PG(13) and PG1(13) are now discharging and the discharge current delays the opening of contact 1. When contact 1 opens, the previously traced circuits become effective and relays PG(13), P(13) and CKP(13) alternately close their contacts 1 and 2 as long as the steady ground is removed from conductor 1300.

Figure 18:
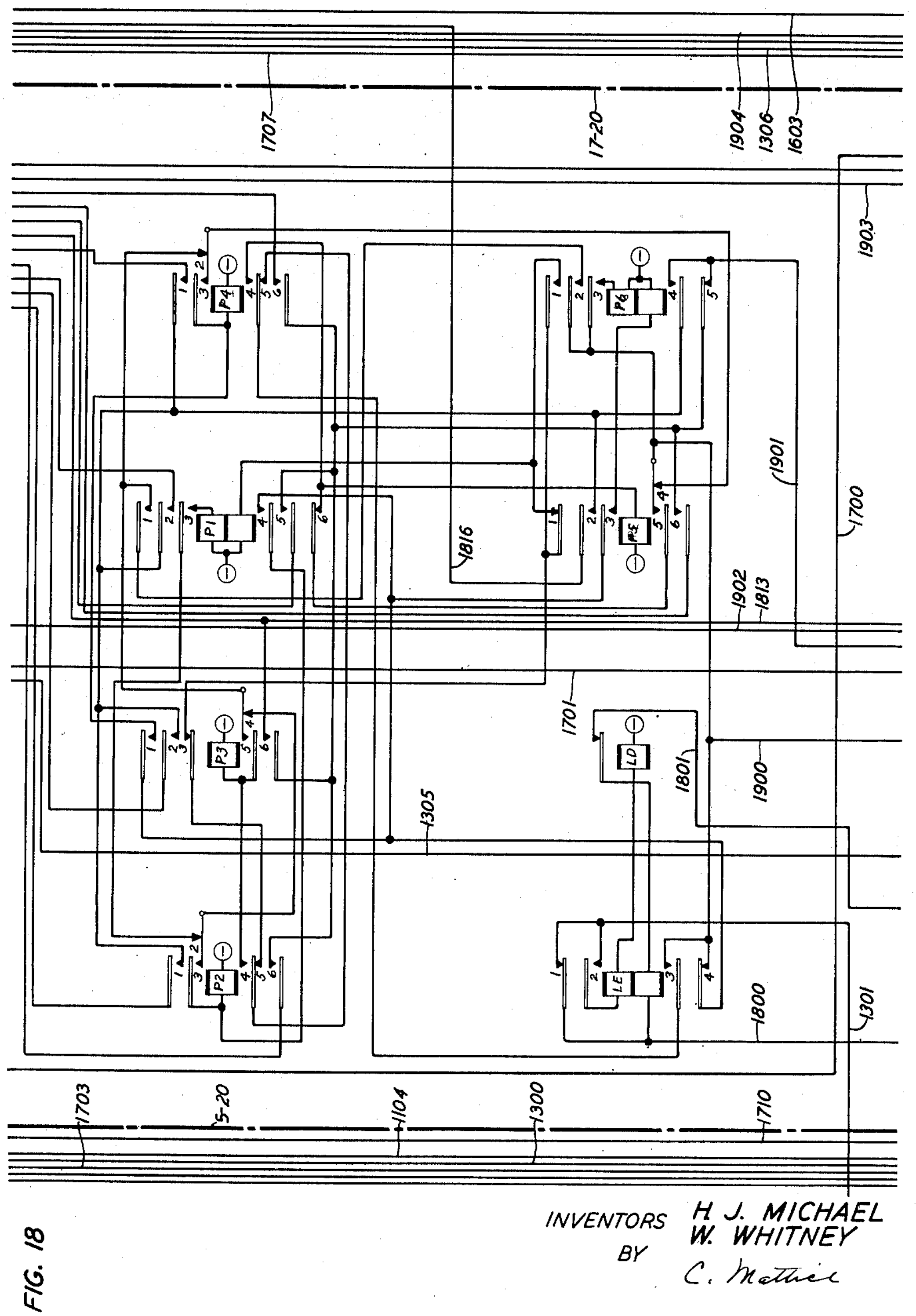
Figure 19:
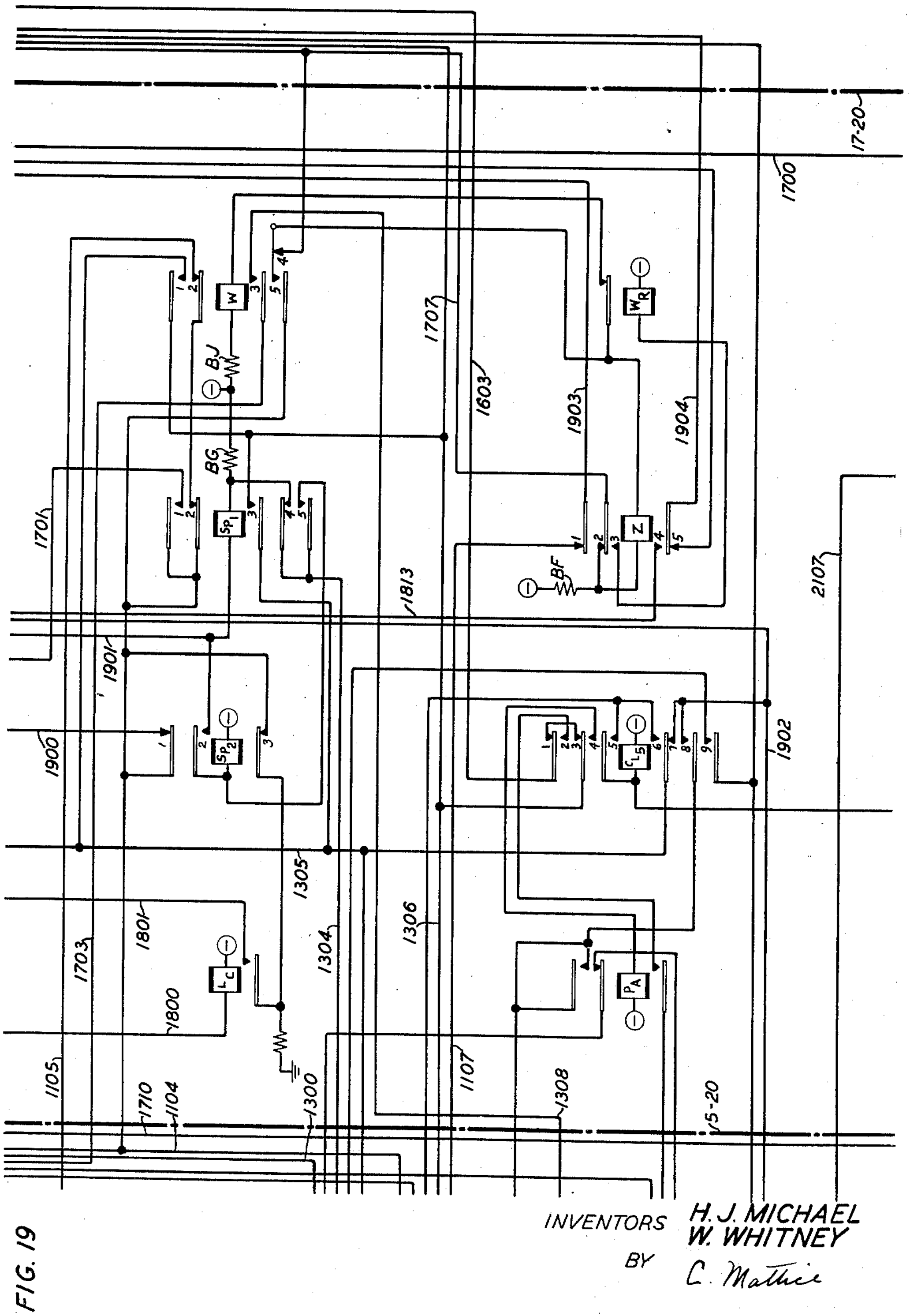

Relay P(13) is ineffective at this time, its contact being shunted over conductors 1305 and 1306 by contact 5 of relay TTK1(17), but relay CKP(13) controls the pulse counting relays of Fig. 18. Each time that relay CKP(13) closes its contact 1 it closes a circuit from ground on conductor 1104, contact 1 of relay CKP(13) to conductor 1301. The first connection of ground to conductor 1301 completes a circuit over contact 1 of relay LE(18), conductor 1800 to battery through the winding of relay LC(19). Relay LC(19) operates, closing a locking circuit for itself, which extends from conductor 1800, through the lower winding of relay LE(18), contact of relay LD(18), conductor 1801, contact of relay LC(19), contact 3 of relay SP2(19), to ground on conductor 1104. Relay LE(18) does not operate, being shunted by the operating circuit of relay LC(19) until relay CKP(13) opens its contact 1.

The second closure of ground to conductor 1301 completes a circuit over contact 2 and through the upper winding of relay LE(18) to battery through the winding of relay LD(18). Relay LD(18) operates and opens the circuit of relay LC(19) but relay LE(18) is held operated. When relay CKP(13) removes ground from conductor 1301, relays LE(18) and LD(18) now release. Thus, relay LE(18) is operated at the end of each odd pulse from relay CKP(13) and released at the end of each even pulse from relay CKP(13).

With relay SP2(19) unoperated, ground from conductor 1104 is extended over contact 1 of relay SP2(19) to conductor 1900. When relay LE(18) operates for the first time it connects ground on conductor 1900 over its contact 3, contact 5 of relay P4(18), contact 5 of relay P2(18), contact 3 of relay P3(18), contact 1 of relay P5(18) to battery through the lower winding of relay P1(18). Relay P1(18) operates and locks in a circuit from battery through its upper winding and over its contact 3, contact 2 of relay P2(18), contact 4 of relay P3(18), contact 2 of relay P4(18), contact 4 of relay P5(18) to ground on conductor 1900.

When relay LE(18) releases at the end of the second pulse it connects ground on conductor 1900, over its contact 4, contact 4 of relay P1(18) to battery through the winding of relay P2(18). Relay P2(18) locks over its contact 3 and thence over contact 4 of relay P3(18), contact 2 of relay P4(18), contact 4 of relay P5(18) to ground on conductor 1900. At its contact 2, relay P2(18) opens the locking circuit of relay P1(18) causing that relay to release.

The third pulse from relay CKP(13) reoperating relay LE(18) causes the operation of relay P3(18) and the release of relay P2(18). Similarly, relays P4(18), P5(18) and P6(18) operate in response to the fourth, fifth and sixth pulses, relay P4(18) releasing relay P3(18) and relay P5(18) releasing relay P4(18). Relay P5(18) locks over contact 6 of relay P1(18) and its own contact 5 to conductor 1900. The sixth pulse operates relay P6(18) which locks in a circuit from battery through its upper winding and over its contact 3 to ground on conductor 1900.

With relays P5(18) and P6(18) operated, a circuit is closed from battery through resistance BG(19), winding of relay SP1(19), conductor 1901, contact 4 of relay P6(18), contact 2 of relay P5(18), conductor 1816, contact 1 of relay TTK1(17) to ground over conductor 1104. While relay CKP(13) is closing its contact 2, following the sixth pulse, it connects ground to conductor 1304 and contact 4 of relay SP1(19) to resistance BG(19) in shunt of the winding of relay SP1(19). At the beginning of the next or seventh pulse, this ground is removed and relay SP1(19) operates and closes a circuit from battery through the winding of relay SP2(19) over contact 5 of relay SP1(19) to conductor 1304 so that at the end of the seventh pulse when relay CKP(13) again grounds conductor 1304, relay SP2(19) operates.

Relay SP1(19) at its contact 3 connects conductors 1305 and 1306 together to short-circuit the contact of relay P(13) and hold that relay ineffective. Relay SP1(19) also closes a circuit from battery through the winding of relay TTK(17), contact 8 of relay TTK1(17), conductor 1701, contact 1 of relay SP1(19) to ground on conductor 1104.

Relay TTK(17) operates and locks in a circuit from battery through its winding and the winding of relay TTK1(17), contact 1 of relay TTK(17) to ground on conductor 1104. Relay TTK1(17) cannot operate, being shunted by the operating circuit of relay TTK(17).

Relay SP2(19), when operated as above described, extends the winding of relay SP1(19) over contact 2 of relay SP2(19), contact 5 of relay SP1(19) to conductor 1304 to hold relay SP1(19) operated under the control of relay CKP(13). At its contact 1, relay SP2(19) disconnects ground from conductor 1900, releasing relays P5(18) and P6(18) and opening the original operating circuit for relay SP1(19).

When relay CKP(13) next opens its contact 2, relays SP1(19) and SP2(19) release, permitting relay TTK1(17) to operate. With relay SP1(19) released and relay TTK(17) operated, ground from conductor 1104 is extended over contact 2 of relay SP1(19), contact 2 of relay W(19), conductor 1105, contact 2 of relay TTK(17), conductor 1702, contact 9 of relay TT1(11) to conductor 1300 to stop the pulsing operation of relay PG(13).

When relays TT2(11) and AV(10) are operated as above described, a circuit is closed from battery through the winding of relay TGT(16), conductor 1602, contact 5 of relay CL3(10), contact 8 of relay AV(10), conductor 1010, contact 2 of relay TT2(11), contact 2 of relay SG(11) to ground at contact 6 of relay ON(11). Relay TGT(16) is slow to operate and after an interval, with relay TTK1(17) operated, closes a circuit from battery through the winding of relay BD(17), conductor 1703, contact 7 of relay CL2(10), conductor 1013, contact 6 of relay TTK1(17), conductor 1704, contact 1 of relay TGT(16), conductor 1011 to ground at contact 6 of relay ON1(11). Relay BD(17) at its contact 4 closes a substitute connection between conductors 1702 and 1300 to hold relay PG(13) inoperative and at its contact 2 opens a short-circuit around the windings of relays TG(16) and OF(16) to prepare for trunk test.

The tip conductor 120 outgoing to the step-by-step office extends through cable 1—10, contact 6 of cross-point 00(11), conductor 1014, contact 3 of relay CT(16), contact 2 of relay LR(16), conductor 1601, contact 7 of relay AV(10), conductor 1015, contact 3 of relay TTK1(17), conductor 1705, windings of relays TG(16) and OF(16), conductor 1603, contacts 1 and 3 of relay CL5(19), conductor 1306, contact 1 of relay P(13) which is held closed at this time, conductor 1305, contact 7 of relay CL5(19), conductor 1902, contact 5 of relay CL6(13), contacts 6 and 1 of relay CL4(13), contact 1 of relay CL6(13), conductor 1307, contact 5 of cross-point 00(10), to the ring conductor 121 leading to the step-by-step office.

The completion of this circuit at the step-by-step office operates relay TG(16) which in turn completes a circuit from ground on conductor 1011, contact 1 of relay BD(17), conductor 1706, contact 2 of relay OF(16), contact of relay TG(16), contact 2 of relay WK(16), contact 4 of relay TGT(16), conductor 1604, to battery through the winding of relay TT1(11). Relay TT1(11) operates and locks over its contact 4 to ground on conductor 1011. At its contact 1, relay TT1(11) opens the circuit of relay TT2(11) which releases slowly, in turn releasing relay TGT(16) and relay BD(17).

Relay TT1(11) closes a circuit from ground on conductor 1102, contact 3 of relay TT1(11), conductor 1107, contact 1 of relay Z(19), conductor 1903 to the called number registers, to further prepare them for transmitting the first digit.

With relay BD(17) released, a short-circuit is closed at its contact 2 around the windings of relays TG(16) and OF(16) reducing the resistance in the pulsing circuit sufficiently to cause the pulsing relay of the step-by-step office to operate.

With relay BD(17) released and relay TT1(11) operated ground is disconnected from conductor 1300, permitting relay PG(13) to again start pulsing, relays P(13) and CKP(13) also pulsing as previously described. Each time that relay P(13) opens its contact 1, it transmits a dial type pulse to the step-by-step office where these pulses are used to control the step-by-step switches in the selection of the wanted line.

Relay CKP(13) controls relays LC(19), LD(18) and LE(18) which in turn operate the pulse counting relays P1(18) to P6(18).

The called number registers determine the number of pulses to be transmitted for each digit, closing a circuit for relay ST1(19) when the last pulse of each digit has been transmitted.

As previously described, as long as relay CKP(13) holds its contact 2 closed, relay SP1(19) cannot operate, but when relay CKP(13) opens its contact 2, relay SP1(19) operates. Since relay TTK1(17) is operated, relay SP1(19) now closes a circuit from ground on conductor 1104, contact 1 of relay SP1(19), conductor 1701, contact 7 of relay TTK1(17), conductor 1707, contact 4 of relay W(19), normally closed contact of relay WR(19) to battery through the winding of relay W(19) and resistance BJ(19). Relay W(19) operates in this circuit and locks in a circuit from battery through resistance BJ(19), winding of relay W(19), contact of relay WR(19), contact 5 of relay W(19) to ground on conductor 1104. Relay W(19) also closes a circuit from battery through resistance BF(19) and the winding of relay Z(19), contact 5 of relay W(19) to ground on conductor 1104, but relay Z(19) cannot operate, being shunted by ground connected to conductor 1707, as traced for the operating circuit of relay W(19), which is connected over contact 2 of relay Z(19) to resistance BF(19) in shunt of the winding of relay Z(19).

Relay W(19) closes a circuit from ground on conductor 1011, contact 2 of relay PC(13), conductor 1308, contact 3 of relay W(19), conductor 1703 to battery through the winding of relay BD(17), operating the latter relay, which removes the shunt around relays TG(16) and OF(16) to check the polarity of the pulsing loop during the interdigital period. Both relays SP1(19) and W(19) connect conductors 1305 and 1306 together in shunt of the contact of relay P(13) to prevent the transmission of further pulses. However, relays PG(13), P(13) and CKP(13) continue to pulse to measure an interdigital time interval. As described in connection with the preliminary timing, relay SP1(19) prepares a circuit for relay SP2(19) which operates when relay CKP(13) next closes its contact 2.

As previously described, relay SP2(19) opens the locking circuit for the pulse counting relays, allowing them to release. It closes a holding circuit for relay SP1(19) under the control of relay CKP(13). It also opens the holding circuit for relays LC(19) and LE(18) causing these relays to release. When relay CKP(13) opens its contact 2, relays SP1(19) and SP2(19) both release, opening the operating circuit of relay W(19) and permitting relay Z(19) to operate in the circuit above traced. Relay Z(19) disconnects ground from conductor 1903, to advance the steering circuit of the called number registers.

With relay SP2(19) released, the pulse counting relays count the operations of relay CKP(13) as previously described and with relay Z(19) operated, the operation of relay P3(18) closes a circuit from battery through the winding of relay SP1(19), conductor 1901, contact 5 of relay P6(18), contact 6 of relay P3(18), conductor 1813, contact 4 of relay Z(19), conductor 1904, contact 2 of relay TTK1(17) to ground on conductor 1104. Relay SP1(19) operates and closes the circuit previously traced from ground to conductor 1707 which now extends over contact 3 of relay Z(19) to battery through the winding of relay WR(19). Relay WR(19) opens the circuit of relay W(19) which releases, in turn releasing relay BD(17) in preparation for sending out the next digit. Relay Z(19) remains operated over contact 4 of relay W(19) under the control of relay SP1(19). Relay SP2(19) is operated as previously described, releasing relay P3(18), after which relays SP1(19), SP2(19), Z(19) and WR(19) release.

The interrupter relays continue to pulse, the pulses being counted and controlled as described above. In the same manner as described, the remaining digits are sent out with an interdigital pause between the digits.

When the last digit has been sent out, the steering circuit in the called number registers connects ground to conductor 1016 operating end-of-pulsing relay EP(10). Relay EP(10) operates in this circuit and locks over its contact 4 to conductor 1108.

Relay EP(11) at its contact 6 connects ground on conductor 1104 to conductor 1300 to stop the operation of the pulsing relays. At its contact 5 relay EP(10) opens the circuit of relay DS(1) in the trunk circuit and of relay CT(16) in the sender.

Relay CT(16) is made slow to release to prevent disconnecting the sender before relay DS(1) has completed its functions in the trunk. At its contact 3 relay CT(16) opens the pulsing circuit and at its contact 6 releases relay LR(16). Relay LR(16) opens the locking circuit of relay ON(11) and the latter relay releases, in turn releasing relay ON1(11) and relay AV(10). The release of relays ON(11) and ON1(11) removes ground from the various off-normal ground conductors permitting any relays locked thereto to release. Relay LR(16) also opens the circuit of hold magnet H0(7) of the sender link, restoring the link to normal.

When relay DS(1) is released, tip conductor 120 leading to the step-by-step office is connected over contact 1 of relay DS(1), conductor 125 through the upper right winding of repeating coil S(2), conductor 217, contact 1 of relay OF(1) through the winding of polarized supervisory relay P(1), contact 4 of relay OF(1), contact 3 of relay S(1), conductor 218, lower right winding of repeating coil S(2), conductor 126, contact 3 of relay DS(1) to the ring conductor 121 leading to the step-by-step office to hold the connection at that office. Tip conductor 123 from jack 105 extends over contact 2 of relay DR(1), conductor 127, through the left winding of repeating coil S(2) conductor 128, contact 5 of relay DR(1) to the ring conductor 124 leading to jack 105, providing a talking circuit through repeating coil S(2).

Relay P(1) does not operate at first in the circuit as closed at the step-by-step office, but when the called subscriber answers, the current flow through relay P(1) is reversed and relay P(1) operates, opening its contact 2 to remove ground from the lower winding of relay SL(1) as a signal to the operator that the call has been answered.

When the called subscriber disconnects, relay P(1) is released, again connecting ground over its contact 2, contact 2 of relay FL(1) and contact 7 of relay DR(1) to the lower winding of relay SL(1) as a signal to the operator that the call has been terminated. The operator then removes cord 101 from jack 105, releasing relay SL(1) which in turn releases relay SL1(1) and restores the trunk circuit to its normal idle condition.

If the operator wishes to establish a connection to a panel office such as office 501, she will insert the plug of her cord 101 in jack 104 leading to the trunk circuit 518 outgoing to that office. This trunk circuit is similar to the trunk circuit of Fig. 1 and functions in a similar manner to call in a multifrequency incoming register. However, it causes the operation of trunk preference relay TP10(2) which is individual to it in the register link, and that relay connects ground to conductor 219 which is so cross-connected at rack 211 as to operate the proper trunk frame relay in the incoming register. Relay TP10(2) also grounds conductor 220 which is cross-connected at rack 214 to conductor 221, completing a circuit over contact 2 of relay CL(2), conductor 222 to battery through the winding of relay PCR(4) in the incoming register.

The operation of relay PCR(4) indicates that pulse conversion to revertive pulsing is required and, when a marker has been connected with the incoming register, closes a circuit from ground at contact 3 of relay R0(8), conductor 817, contact 1 of relay PCR(4), conductor 413, contacts of relays RA(21) and MA(21) in the marker connector, conductor 2108, to battery through the winding of relay PCR(20) in the marker.

Relay PCR(20) operates the corresponding route relay R2(20) which in turn operates a sender group relay OSG2(20) individual to a group of senders equipped to respond to revertive pulses. Relay OSG2(20) operates relays OGC(14), OSC(14) and SON(14) in the same manner as did relay OSG1(14) to prepare for sender selection. However, it connects relay SIA(14) over conductor 1418 and its contact 2 to the revertive pulse outgoing senders such as sender 503 to test for an idle sender in the group individual to relay OSG2(20) and with relay SIA(14) operated, closes a start circuit for the revertive pulse sender-connector 504.

Relay PCR(20) also operates relays PCL1(14), PCL2(14) and PCL3(14) which function as previously described. Relay PCR(20), however, operates relay KSG(20), in place of relay K(20), to control the transfer of the called line designation to the selected revertive pulse sender. Otherwise the operation of the marker for pulse conversion to revertive pulsing is the same as described for conversion to dial type pulsing.

In the case of an incoming call from a cross bar office equipped to send out multifrequency pulses such as office 506, the call is received on an incoming trunk circuit such as trunk 507 which calls in the register link by operating a trunk preference relay such as relay TP19(2). Such a trunk preference relay grounds conductor 223 which is cross-connected at rack 214 to conductor 224 which is extended by the operation of relay CL(2) to conductor 225 and to battery through the winding of a class relay such as relay OA(4), which in turn connects ground on conductor 818 to conductor 414 leading through the marker-connector to equipment (not shown) in the marker which prepares the marker for receiving the called number on the proper registers. In addition, relay OA(4) closes a circuit from ground at contact 1 of relay RO(8), conductor 818, contact 3 of relay OA(4), conductor 415, over contacts of relay RA(21) and MA(21) in the marker-connector, conductor 2109 to battery through the winding of relay INC(14) to inform the marker that it has been seized in connection with an incoming call. Relay INC(14) operates relays TER1(14), TER2(14) and TER3(14) which prepare the marker to extend the incoming trunk to the called subscriber's line as described in the above-identified Busch patent.

What is claimed is:

1. In a telephone system including automatic switches and incoming and outgoing trunks appearing in said automatic switches for the automatic establishment of telephone connections, designation registers normally serving incoming trunks, pulse transmitting senders normally serving outgoing trunks, an operator's position, a manually controlled pulse generator at said operator's position, operator trunks appearing at said position, manual means for seizing one of said operator trunks and connecting said pulse generator with a seized operator trunk, means responsive to the manual seizure of one of said operator trunks to connect said operator trunk with an idle one of said designation registers, and means, responsive to the registration of a designation in said designation register under the control of said pulse generator, to cause the connection of one of said pulse transmitting senders with said operator trunk.

2. In a telephone system including automatic switches and incoming and outgoing trunks appearing in said automatic switches for the automatic establishment of telephone connections, designation registers normally serving incoming trunks, pulse transmitting senders normally serving outgoing trunks, an operator's position, a manually controlled pulse generator at said operator's position, operator trunks appearing at said position, manual means for seizing one of said operator trunks and connecting said pulse generator with a seized operator trunk, means responsive to the manual seizure of one of said operator trunks to connect said operator trunk with an idle one of said designation registers, means to register a designation in said designation register under the control of said pulse generator, a switch controlling marker, means responsive to said designation registration in said register to connect said register with said marker, and means in said marker to cause the connection of one of said pulse transmitting senders with said operator trunk and the transfer of said designation from said register to said one sender.

3. In a telephone system including automatic switches and incoming and outgoing trunks appearing in said automatic switches for the automatic establishment of telephone connections, designation registers normally serving incoming trunks, pulse transmitting senders normally serving outgoing trunks, an operator's position, a manually operated pulse generator at said operator's position, operator trunks appearing at said position, manual means for seizing one of said operator trunks and connecting said pulse generator with a seized operator trunk, means responsive to the manual seizure of one of said operator trunks to connect said operator trunk with an idle one of said designation registers, means to register a designation in said designation register under the control of said pulse generator, a switch controlling marker, means responsive to said designation registration in said register to connect said register with said marker, means in said marker to select an idle one of said senders and to connect said selected sender with said operator trunk and means in said marker to control the transfer of said designation from said register to said one sender.

4. In a telephone system, one office, an operator's position at said one office, a manually controlled pulse generator at said position for generating a particular type of pulse, other offices, receiving means at said other offices requiring different types of pulses, trunks appearing at said operator's position and extending to said other offices for connection with said receiving means, means for connecting said pulse generator with any one of said trunks, designation registers, register connecting means, means responsive to the connection of said pulse generator with one of said trunks to operate said register connecting means to connect said one trunk with one of said designation registers means to register a designation in said one designation register under the control of said pulse generator, a plurality of types of pulse transmitting senders each type of sender arranged to transmit a different type of pulse, means, responsive to said designation registration to cause the selective connection of said one trunk with one of said pulse transmitting senders of the type arranged to transmit the type of pulses required by the receiving means at the office to which said one trunk extends and means in said one sender to transmit said registered designation over said one trunk to the connected receiving means.

5. In a telephone system, one office, an operator's position at said one office, a manually controlled pulse generator at said position for generating a particular type of pulse, other offices, receiving means at said other offices requiring different types of pulses, trunks appearing at said operator's position and extending to said other offices for connection with said receiving means, means for connecting said pulse generator with any one of said trunks, designation registers, register connecting means, means responsive to the connection of said pulse generator with one of said trunks to operate said register connecting means to connect said one trunk with one of said designation registers, a plurality of types of pulse transmitting senders each type of sender arranged to transmit a different type of pulse, means responsive to the operation of said pulse generator to register a designation on said one designation register, a switch controlling marker, means responsive to said designation registration to connect said one register with said marker, means in said marker to select an idle one of said pulse transmitting senders of the type arranged to transmit the type of pulses required by the receiving means at the office to which said one trunk extends and to connect said selected sender with said one trunk, means in said marker to control the transfer of said registered designation from said one register to said one sender, and means in said sender to transmit said registered designation over said one trunk to the connected receiving means.

6. In a telephone system, a first office, a plurality of other offices, said first office including automatic switches in which trunks incoming from and outgoing to said other offices appear for the automatic establishment of telephone connections, different ones of said other offices including transmiting means and receiving means arranged to send and receive different types of pulses to and from said first office, a plurality of types of designation registers at said first office normally serving incoming trunks, each type of register arranged to receive a different type of pulse, a plurality of types of senders at said first office normally serving outgoing trunks, each type of sender arranged to transmit a different type of pulse, an operator's position, trunks appearing at said operator's position and extending to said other offices independent of said automatic switches, a key-set at said operator's position arranged to generate a particular one of said types of pulse, means to connect said key-set with one of said operator trunks, register connecting means, means responsive to the connection of said key-set with said one operator trunk to operate said register connecting means to selectively connect said operator trunk with one of said designation registers of the type arranged to receive said one type of pulse, pulse type indicating means in said register, means responsive to the connection of said one trunk with said one register to selectively operate said indicating means to indicate the type of pulse required by the office to which said one trunk extends, means responsive to the operation of said key-set to register a designation in said designation register, a switch controlling marker, means responsive to said registration to connect said designation register with said marker, means to transfer said designation and said pulse type indication to said marker, means in said marker responsive to said pulse type indication to select one of said senders of the type arranged to transmit the indicated type of pulse, to connect said selected sender with said one operator trunk and to transfer said designation to said selected sender, and means in said sender to transmit said registered designation over said one trunk to the connected receiving means.

HENRY J. MICHAEL.
WILEY WHITNEY.

REFERENCES CITED

The following references are of record in the file of this patent:

UNITED STATES PATENTS

| Number | Name | Date |
|---|---|---|
| 1,672,994 | Thompson | June 12, 1928 |
| 2,211,116 | Hensler | Aug. 13, 1940 |
| 2,235,890 | King | Mar. 25, 1941 |
| 2,467,490 | McClew | Apr. 19, 1949 |